US011225188B2

(12) United States Patent
Bossenbroek et al.

(10) Patent No.: US 11,225,188 B2
(45) Date of Patent: Jan. 18, 2022

(54) CONTAINER MOUNTING SYSTEM FOR VEHICLES

(71) Applicant: Pelican Products, Inc., Torrance, CA (US)

(72) Inventors: Scott Lee Bossenbroek, Cerritos, CA (US); Robert Clifford Tennant, Hermosa Beach, CA (US)

(73) Assignee: Pelican Products, Inc., Torrance, CA (US)

( * ) Notice: Subject to any disclaimer, the term of this patent is extended or adjusted under 35 U.S.C. 154(b) by 0 days.

(21) Appl. No.: 16/744,787

(22) Filed: Jan. 16, 2020

(65) Prior Publication Data
US 2021/0221276 A1 Jul. 22, 2021

(51) Int. Cl.
*B60R 9/06* (2006.01)
*B60P 7/08* (2006.01)
*B60R 5/04* (2006.01)
*B60R 11/00* (2006.01)

(52) U.S. Cl.
CPC .............. *B60P 7/0815* (2013.01); *B60R 9/06* (2013.01); *B60R 5/04* (2013.01); *B60R 2011/008* (2013.01); *B60R 2011/0059* (2013.01)

(58) Field of Classification Search
CPC . B60P 7/0815; B60R 9/06; B60R 5/04; B60R 2011/0059; B60R 2011/008
USPC ........................................................ 224/404
See application file for complete search history.

(56) References Cited

U.S. PATENT DOCUMENTS

| 1,778,771 | A | * | 10/1930 | Pritchard | B60R 9/02 224/482 |
|---|---|---|---|---|---|
| 4,518,189 | A | | 5/1985 | Belt | |
| 4,635,992 | A | | 1/1987 | Hamilton et al. | |
| 4,728,017 | A | * | 3/1988 | Mullican | B60R 9/00 224/328 |
| 5,799,849 | A | * | 9/1998 | Beer | B60R 11/00 224/282 |
| 6,082,804 | A | * | 7/2000 | Schlachter | B60R 9/00 224/281 |
| 6,170,896 | B1 | | 1/2001 | Harris et al. | |
| 6,863,198 | B1 | * | 3/2005 | Darby | B60R 7/02 224/403 |
| 9,925,909 | B2 | * | 3/2018 | Byham | B60P 3/055 |
| 10,343,587 | B2 | * | 7/2019 | Frazier | B60P 7/0807 |
| 10,464,466 | B2 | * | 11/2019 | Line | B60P 7/08 |

(Continued)

OTHER PUBLICATIONS

Australian Examination Report dated Dec. 17, 2020, from application No. 2020201888.

(Continued)

*Primary Examiner* — Peter N Helvey
(74) *Attorney, Agent, or Firm* — Foley & Lardner LLP

(57) ABSTRACT

A mounting system for securing a container to a bed of a vehicle includes a mounting bracket that is adjustable in its length dimension. A first connection joint is for attaching the first end portion to a sidewall of the bed. A second end portion has at least one foot portion for engaging a floor surface of the bed. A second connection joint is for attaching a central portion of the mounting bracket to the container. The bracket is adjustable to a length dimension sufficient to engage the foot portion of the bracket to the bottom surface of the bed, while the bracket is attached to the side wall of the bed through the first connection joint.

18 Claims, 14 Drawing Sheets

(56) References Cited

U.S. PATENT DOCUMENTS

| | | |
|---|---|---|
| 2007/0241580 A1 | 10/2007 | Ward |
| 2011/0204110 A1* | 8/2011 | Read ................. B60R 9/065 |
| | | 224/560 |
| 2012/0155997 A1 | 6/2012 | Pawlak |
| 2016/0347256 A1 | 12/2016 | Lambert |
| 2017/0043699 A1 | 2/2017 | Gordon |
| 2017/0369284 A1 | 12/2017 | Dorminey et al. |
| 2019/0077294 A1 | 3/2019 | Line et al. |

OTHER PUBLICATIONS

Extended European Search Report dated Jun. 2, 2021, from application No. 20214519.9.

* cited by examiner

CONTAINER MOUNTING SYSTEM FOR VEHICLES

BACKGROUND

The present disclosure relates generally to mounting systems for mounting containers, such as cases or trunks (or other objects) to a bed of a truck or other vehicle, and to processes of making and using such systems. Various types of vehicles, such as, but not limited to pickup trucks, panel trucks, or other types of trucks, train cars, ships and planes typically have a cargo bed, deck or other surface for carrying cargo (which may include one or more cases, trunks or other containers, or the like).

Containers, trunks or cases as described herein may include any suitable rigid structure having an outer shell surrounding a hollow or partially hollow interior volume for holding or containing one or more objects, items, goods, fragile or breakable articles, tools, equipment, live cargo, biological cargo, other cargo or the like. In particular examples, containers, trunks or cases as described herein are configured to be taken to or from a vehicle, and to be selectively mounted to a bed, deck or other surface of a vehicle to be carried on and transported by the vehicle between geographic locations. Different types and sizes of container structures may be used for different types of cargo, or for different contexts or applications of use.

When placed on a bed or deck of a vehicle, containers, trunks or cases can tend to slide, bump and collide with each other or the wall of the vehicle bed, as the vehicle moves. Various straps or racks have been developed, to help hold containers, trunks, cases or other cargo in place and inhibit them from moving within the vehicle bed, during transportation. In addition, cargo boxes and tool boxes have been mounted to side walls and beds of pickup trucks in permanent or semi-permanent manners, where the cargo or tool boxes are intended to remain fixed to the bed of the vehicle. However, such conventional configurations typically do not provide a user-friendly system that not only securely mounts containers, trunks or cases to a bed of a vehicle, but also allows the containers to be easily placed on or removed from the vehicle bed, is sufficiently rugged and durable to withstand multiple sequences of mounting and removing the container, trunk or case, and can readily mount to one or more types of vehicle beds.

SUMMARY

Example embodiments described herein relate to mounting systems for mounting cases or trunks (or other objects) to a bed of a truck or other vehicle, and to processes of making and using such systems.

A mounting system for securing a container to a bed of a vehicle, according to an example embodiment, includes a mounting bracket having a length dimension and being adjustable in the length dimension. The mounting bracket has a first end portion and a second end portion in the length dimension. The second end portion has at least one foot portion for engaging a floor surface of the bed. The system includes a first connection joint for attaching the first end portion of the mounting bracket to a sidewall of the bed, and a second connection joint for attaching a central portion of the mounting bracket to the container. The bracket is adjustable to a length dimension sufficient to engage the foot portion of the bracket to the bottom surface of the bed, while the bracket is attached to the side wall of the bed through the first connection joint.

In further examples, the mounting system includes the container, and the container has at least one container bracket configured to attach to the second connection joint, for attaching the central portion of the mounting bracket to the container.

In further examples of the mounting system, the mounting bracket has a first pair of flanges defining a gap between the flanges, and a shaft is connected to the first pair of flanges and extending across the gap. In addition, one of the container brackets has a further flange that is configured to be selectively received within the gap between the first pair of flanges of the mounting bracket. The further flange has a slot-shaped feature that is configured to receive the shaft, when the further flange of the container bracket is received within the gap between the first pair of flanges of the mounting bracket.

In further examples, the mounting system includes at least one connector pin, and each of the flanges of the first pair of flanges and the further flange include a pin aperture configured to align and selectively receive one of the connector pins when the further flange of the container bracket is received within the gap between the first pair of flanges of the mounting bracket.

In further examples of the mounting system, the connector pin is received within the pin apertures when aligned, and is manually removable from the pin apertures.

In further examples, the mounting system includes at least one cotter pin, and each connector pin has a cotter pin hole for selectively receiving one of the cotter pins when the connector pin is received in the pin apertures of the flanges of the first pair of flanges and the further flange, for inhibiting removal of the connector pin from the pin apertures.

In further examples of the mounting system at least one of the flanges of the first pair of flanges includes an opening for receiving a padlock or other locking mechanism. In addition, each cotter pin has a loop or further opening that is configured to be aligned with the opening in the at least one of the flanges, for receiving the padlock or other locking mechanism, to selectively lock the cotter pin in the connector pin and inhibit removal of the connector pin from the aligned pin apertures in the first pair of flanges and the further flange.

In further examples of the mounting system the mounting bracket has a second pair of flanges defining a gap between the second pair of flanges. In addition, the mounting bracket has a second shaft connected to the second pair of flanges and extending across the gap. A second one of the container brackets has a second further flange that is configured to be selectively received within the gap between the second pair of flanges of the mounting bracket. The second further flange has a slot-shaped feature that is configured to receive the second shaft, when the second further flange of the container bracket is received within the gap between the second pair of flanges of the mounting bracket.

In further examples of the mounting system the mounting bracket comprises a plurality of bracket sections that are arranged adjacent to each other and slidable relative to each other in the length dimension of the mounting bracket, to adjust the length dimension of the mounting bracket.

In further examples, the mounting system includes at least one first fastener that connects the plurality of bracket sections of the mounting bracket together for sliding motion.

In further examples of the mounting system, the plurality of bracket sections of the mounting bracket includes a first bracket section having a first aperture through which the at least one first fastener extends, and a second bracket section having a second aperture through which the at least one first fastener extends. In addition, at least one of the first and second apertures has an elongated slot-shaped length dimension extending along at least a portion of the length dimension of the mounting bracket. The at least one first fastener is configured to be selectively loosened to allow the first bracket section and the second bracket section to slide relative to each other while the at least one first fastener moves along the length dimension of at least one of the elongated first or second apertures to adjust the length of the mounting bracket, and to be selectively tightened to lock or fix the length of the mounting bracket.

In further examples of the mounting system, at least one of the first bracket section and the second bracket section has at least one first engagement feature. In addition, at least one of the first bracket section and the second bracket section has at least one second engagement feature that is configured to selectively engage with the at least one first engagement feature when the first bracket section and the second bracket section are in a particular slid state relative to each other. The first bracket section and the second bracket section are inhibited from further sliding movement relative to each other when the at least one first engagement feature and the at least one second engagement feature are engaged with each other and the at least one first fastener is tightened.

In further examples of the mounting system, the at least one first engagement feature comprises at least one raised rib or other protrusion, and the at least one second engagement feature comprises at least one recess or opening having a size and shape to receive the at least one rib or other protrusion.

In further examples of the mounting system, the plurality of bracket sections of the mounting bracket further includes a third bracket section having a third aperture through which the at least one second fastener extends. In addition, the second bracket section has a fourth aperture through which the at least one second fastener extends. At least one of the third and fourth apertures has an elongated slot-shaped length dimension extending along at least a portion of the length dimension of the mounting bracket. The at least one second fastener is configured to be selectively loosened to allow the third bracket section and the second bracket section to slide relative to each other while the at least one second fastener moves along the length dimension of at least one of the elongated third or fourth apertures to adjust the length of the mounting bracket, and to be selectively tightened to lock or fix the length of the mounting bracket.

In further examples of the mounting system, the first bracket section includes the first end portion of the mounting bracket, the third bracket section includes the at least one foot portion of the mounting bracket, and the second bracket section includes the central portion of the mounting bracket.

In further examples of the mounting system, at least one of the first bracket section, second bracket section or third bracket section has at least one first engagement feature, and at least one of the first bracket section, second bracket section or third bracket section has at least one second engagement feature that is configured to selectively engage with the at least one first engagement feature when two of the first bracket section, second bracket section or third bracket section are in a particular slid state relative to each other. The two bracket sections are inhibited from further sliding movement relative to each other, when the at least one first engagement feature and the at least one second engagement feature are engaged and the at least one first fastener or the at least one second fastener are tightened.

In further examples of the mounting system, the at least one first engagement feature comprises at least one raised rib or other protrusion, and the at least one second engagement feature comprises at least one recess or opening having a size and shape to receive the at least one rib or other protrusion.

In further examples of the mounting system, the first connection joint includes at least one further bracket section that is configured to be arranged within a rail on the sidewall of the bed, and at least one fastener for connecting the first end portion of the mounting bracket to the at least one further bracket section, with a portion of the rail arranged between the first end portion of the mounting bracket and the at least one further bracket section.

In further examples of the mounting system, the first connection joint includes at least one further bracket section that is configured to be arranged adjacent an upper flange or lip on the sidewall of the bed, and at least one fastener for connecting the first end portion of the mounting bracket to the at least one further bracket section, with a portion of the upper flange or lip arranged between the first end portion of the mounting bracket and the at least one further bracket section.

In further examples of the mounting system, the at least one foot portion includes at least one shoe having a friction enhancing surface for enhancing frictional engagement with the floor surface of the bed.

BRIEF DESCRIPTION OF THE DRAWINGS

The above and other aspects and features of the present invention will become more apparent to those skilled in the art from the following detailed description of the example embodiments with reference to the accompanying drawings, in which.

DETAILED DESCRIPTION

Figure 1:
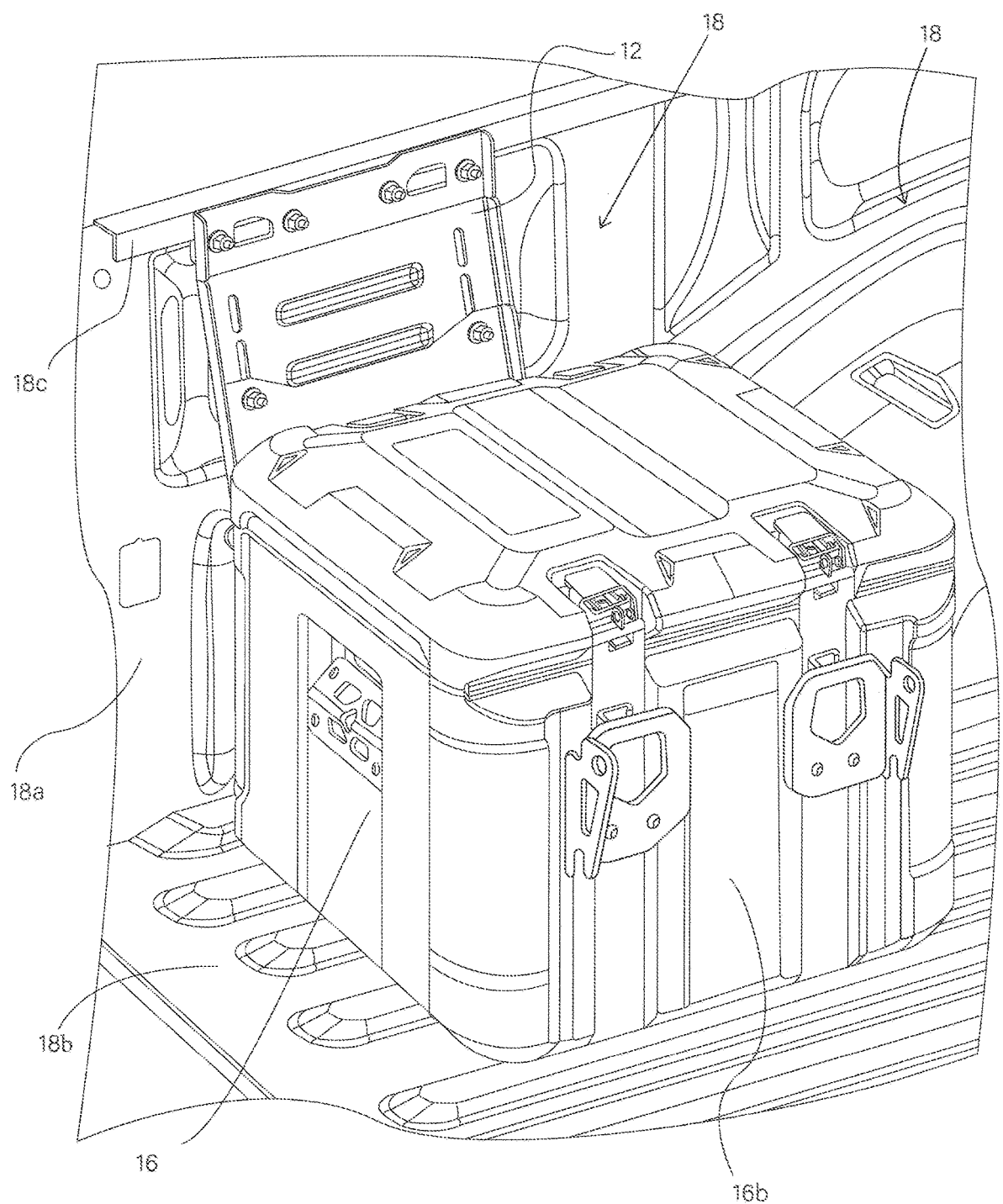
FIG. 1 is a perspective view of a mounting system including a container installed in a vehicle bed, according to an exemplary embodiment.

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

Embodiments described herein relate to mounting systems that may be used in various contexts, for mounting one or more containers, trunks or cases (hereinafter "container" or "containers") onto a bed of a vehicle. In some examples, the mounting system may be configured to mount other types of objects, items or cargo to the bed of a vehicle, or to mount containers, trunks or cases (or other cargo) on a surface of a warehouse, shelf, or other structure. Certain embodiments include a system of one or more brackets configured for mounting a container, trunk or case (or other cargo), while other embodiments include a system of one or more of such brackets in combination with one or more containers, trunks or cases.

Example embodiments of a mounting system 10, and components thereof, are shown in FIGS. 1-11. In particular examples, the mounting system 10 includes a mounting bracket 12 configured to secure a container 16 to a bed 18 of a vehicle such as, but not limited to a pickup truck. In certain examples, the mounting system 10 includes the mounting bracket 12 with or without mounting hardware. In certain examples, the mounting system 10 includes the mounting bracket 12 and also includes a container 16, with or without mounting hardware. In one example, the vehicle bed 18 is a bed of a standard pickup truck such as, but not limited to a Toyota Tacoma, Toyota Tundra, Ford F-150, Ford Raptor, Ford Ranger, Chevrolet Silverado, GMC Sierra, Dodge Ram, Nissan Frontier, Nissan Titan, Jeep Gladiator, or the like. In other examples, the bed 18 is a bed of another pickup truck or other type of truck or other wheeled vehicle. In certain examples, the bed 18 is a cargo bed or deck of a train car, ship, plane or other type of vehicle.

In particular examples, the mounting bracket 12 is configured to mount to certain standard structural features (such as, but not limited to flanges, rails or contoured surfaces) on a sidewall of the vehicle bed 18 (such as, but not limited to the sidewall 18a in FIG. 1). In certain examples, the mounting bracket 12 is configured to mount to either the left sidewall, the right sidewall or the rear sidewall of the vehicle bed. In particular examples, the mounting bracket 12 and container 16 are configured to mount to a sidewall of a vehicle bed, adjacent a tailgate of the vehicle bed (as shown in FIG. 1), to allow ready access to the container 16 through an open tailgate, while the container 16 and the mounting bracket 12 of the mounting system 10 are mounted to the sidewall 18a of the vehicle bed 18.

Container

The container 16 may be configured for specific contexts and applications of use (for containing, transporting, storing or the like, of specific objects, items or cargo or specific types of objects, items or cargo). However, containers included in or used with further example embodiments described herein may be used for more general contexts and applications of use (for multiple types of cargo). Such containers may be configured to hold cargo, to protect cargo from damage, to form a barrier between hazardous material and cargo, or any combination thereof.

In certain examples, the container 16 may include an outer shell structure having an interior volume configured to hold one or more objects, items, goods, fragile or breakable articles, tools, equipment, live cargo, biological cargo, or the like (cargo). In some examples, the outer shell structure of the container 16 may include one or more (or a plurality of) side walls (including side wall 16a shown in FIGS. 8-11, but out of view and facing the bracket 12 in FIG. 1), a bottom wall and a top wall, surrounding the hollow or partially hollow interior volume. One of the side, bottom or top walls may form a door or lid, for selectively closing the interior volume or opening and providing access to the interior volume. In the illustrated examples, the container 16 has four side walls, a bottom wall and a top wall that forms a lid, enclosing an interior volume (not shown). In particular examples, the outer shell of the container 16 has a generally square cube shape or a generally rectangular cube shape. However, in other examples, the outer shell of the container may have other suitable shapes including, but not limited to other polygonal cubic shapes, curved shapes or shapes having a combination of flat and curved surfaces.

In some examples, the lid or top wall of the container 16 is selectively moveable or removable (relative to the side walls) to selectively open or close the container 16. In some embodiments, the container 16 includes one or more hinges coupled to one of the side walls of the container 16 and the lid or top wall, to facilitate selective pivoting of the lid or top wall relative to the side walls between a closed configuration and an open configuration. The closed configuration being when the lid or top wall is in a closed state to isolate or partially isolate the interior from an ambient environment outside of the outer shell of the container 16. The open configuration being when the lid or top wall is in an open state such that the interior is open to the ambient environment. In other embodiments, the lid or top wall of the container 16 is coupled to one or more of the side walls of the container 16 via fasteners (e.g., screws, nails, rivets, etc.) or adhesive (e.g., glue, tape, etc.). In certain examples, the outer shell and (or) the side walls of the container 16 may include one or more latches or locks to selectively latch or lock the lid or top wall to the side walls, and to selectively unlatch or lock the lid or top wall from the side walls of the container 16 and allow the lid or top wall to be pivoted, moved or removed to open the outer shell and allow access to the interior.

The outer shell and lid of the container 16 may be formed of a suitably rigid material that holds its shape and resists impacts up to a definable magnitude of force. For example, the outer shell and lid of the container 16 may be made of one or more (or any combination) of plastic or other polymer, metal, wood, composite material, or the like. The outer shell and lid of the container 16 may be made by any suitable manufacturing method or methods including, but not limited to injection molding, rotational molding (roto-molding), blow molding, other molding methods, cutting or other machining, or the like. In particular examples, the outer shell and lid of the container 16 are made of a high strength resin polymer material that can be readily molded into a desired shape.

One or more container brackets (described below) are secured to or formed on one side of the outer shell of the container 16, and are configured to be selectively connected and secured to (or selectively disconnected and separated from) the mounting bracket 12, as described below. In the illustrated embodiment, two container brackets 26 and 28 (described below) are connected and fixed to a rear side of the container (i.e., the side facing the sidewall 18a of the vehicle bed 18 in FIG. 1). In certain examples, the rear side of the container 16 is a side of the container to which the top or lid of the container 16 is connected by a hinge, such that the container lid may be opened from its front side (facing outward, to the right in the orientation of FIG. 1), while the container brackets 26 and 28 of the container 16 is connected to the mounting bracket 12 and, thus, secured to the sidewall 18a of the vehicle bed 18. The mounting bracket 12, when secured to the sidewall 18a of the vehicle bed 18, and when also connected to the container brackets 26 and 28 on the container 16, help to reduce or minimize movement of the container 16 relative to the vehicle bed 18.

Mounting Bracket

Referring to FIGS. 1-7, the mounting bracket 12 of the mounting system 10 is configured to be located between the sidewall 18a of the vehicle bed 18 and one side of the outer shell of the container 16. In other examples, the mounting bracket 12 is configured to be located between the floor 18b of the vehicle bed 18 and the outer shell of the container 16. In particular examples, the mounting bracket 12 has a length dimension (from and including a first end portion 12a to and including a second end portion 12b) and is adjustable to change its length dimension.

The mounting bracket 12 may comprise a generally rigid structure made of any suitable material or materials such as, but not limited to, metal, plastic, wood, composite materials, combinations thereof, or the like. In some examples, the mounting bracket 12 may include one or more elastic or flexible structures or sections, for example, springs, rubber, or the like, that allow, but dampen movement of the container 16 relative to the vehicle bed 18. In other examples, the mounting bracket is formed of generally rigid materials that have no elastic or flexible sections.

The mounting bracket 12 includes a bracket body that has a first end portion 12a (the upper end in FIGS. 1 and 2) that interfaces and connects with the sidewall 18a of the truck bed 18 and a second end portion 12b that interfaces with the floor 18b of the truck bed 18. The bracket body also interfaces and connects with the container brackets 26 and 28 on the container 16. In some examples, the bracket body is configured to removably connect (and be selectively connectable and dis-connectable) to one or more (or each) of the sidewalls 18a, the floor 18b, or the container brackets 26 and 28 of the container 16, to facilitate mounting or removal of the mounting system or of the container to or from the vehicle bed 18, or to facilitate replacement or servicing of a mounting bracket 12 or the container 16. In some examples, the bracket body is permanently coupled to one or more (or each) of the sidewalls 18a, the floor 18b, or the container brackets 26 and 28 of the container 16.

The bracket body of the mounting bracket 12 is connectable to the sidewall 18a through a first connection joint. In some examples, the first connection joint is a pivotal joint that pivotally connects the bracket body of the mounting bracket 12 to the sidewall 18a. In other examples, the first connection joint is a non-pivotal (or fixed) connection that connects the bracket body of the mounting bracket 12 to the sidewall 18a and inhibits pivotal movement of the bracket body relative to the sidewall 18a. In particular examples, the bracket body of the mounting bracket 12 is configured to be pivotally mounted or fixedly mounted to the sidewall 18a of the vehicle bed, and may be adjusted and set to a length at which the second end portion 12b engages the floor 18b of the vehicle bed 18 and inhibits pivotal motion of the mounting bracket 12 relative to the sidewall 18a, or provides additional stability to the mounting bracket 12.

In some examples, the bracket body of the mounting bracket 12 is connectable to the container brackets 26 and 28 through one or more second connection joints. In some examples, each second connection joint is a pivotal joint that pivotally connects the container 16, to be pivotal relative to the mounting bracket 12. In other examples, each second connection joint provides a non-pivotal (fixed) connection of the container 16 to the mounting bracket 12.

In some examples, the first end portion 12a of the mounting bracket 12 has a width dimension larger than a width dimension of the second end portion 12b. A sufficiently wide width dimension of the first end portion 12a can help to distribute a supporting load (at the connection interface between the mounting bracket 12 and the sidewall 18a) over a relatively wide spacing and can help to increase strength and stability of the mounting system 10, particularly in the horizontal dimension of the vehicle bed 18. However, in other examples, the width dimension of the first end portion 12a of the mounting bracket is the same as or is smaller than the width dimension of the second end portion 12b of the mounting bracket 12.

In particular examples, the mounting bracket 12 is configured to be adjustable in its length dimension (the length dimension from and including a first end portion 12a to and including a second end portion 12b). In certain examples, any suitable length-adjustable bracket structure may be employed for the mounting bracket 12. In particular examples, the bracket body of the mounting bracket 12 has a plurality of structural sections, at least some of which are moveable or slideable relative to each other, to change and adjust the length of the mounting bracket 12. In the illustrated example, the bracket body of the mounting bracket 12 includes three sections that are moveable or slideable relative to each other. In other examples, the bracket body of the mounting bracket may include two sections or more than three sections, some or each of which being moveable or slideable relative to each other.

In the illustrated example, the bracket body of the mounting bracket 12 includes a first section 20, a second section 22, and a third section 24. The first section 20 includes the first end portion 12a of the mounting bracket 12. The third section 24 includes the second end portion 12b of the mounting bracket 12. The second section 22 is located between the first and third sections.

Figure 3:
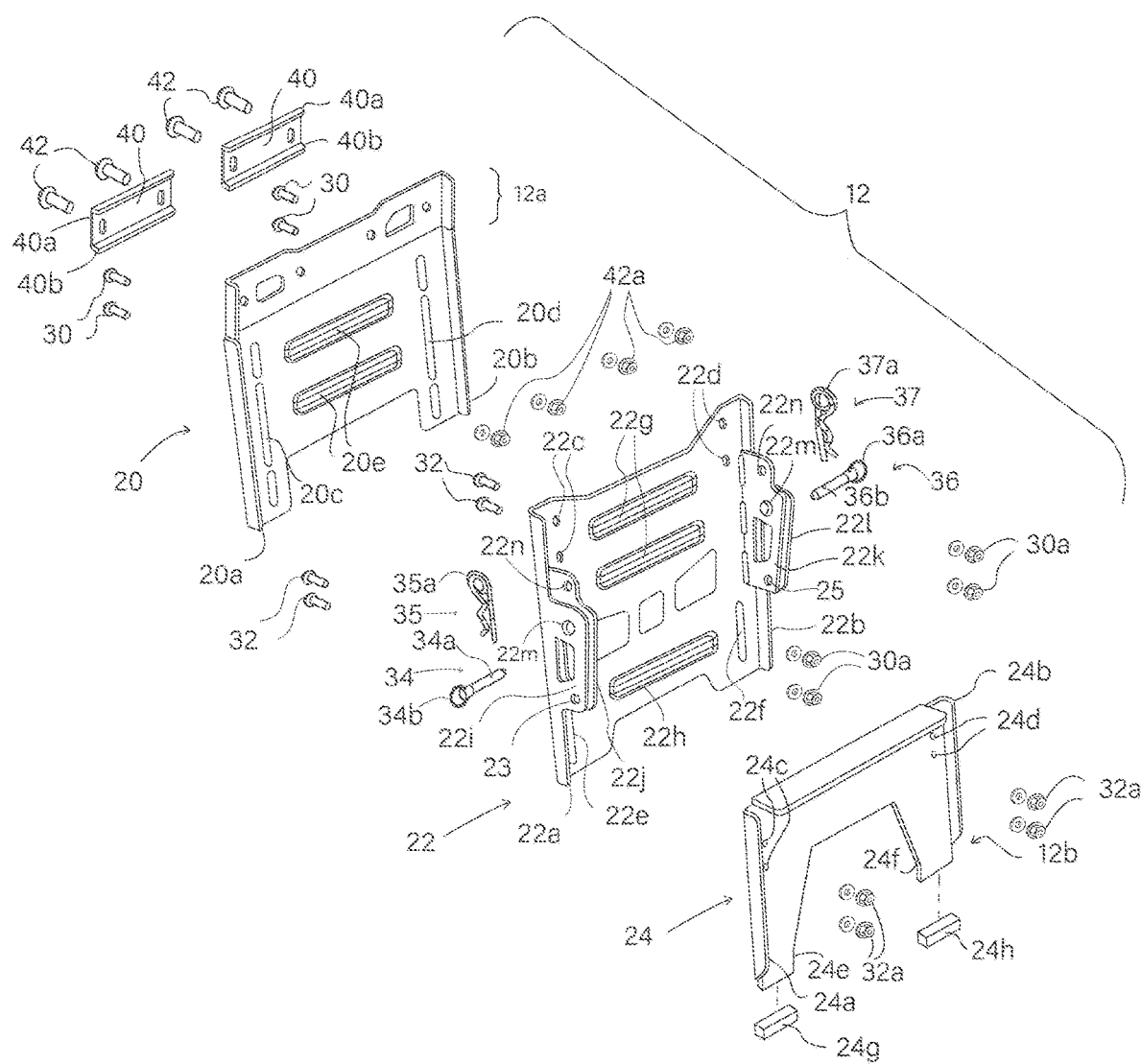
FIG. 3 is an exploded view of the mounting bracket of FIG. 2.
Figure 4:
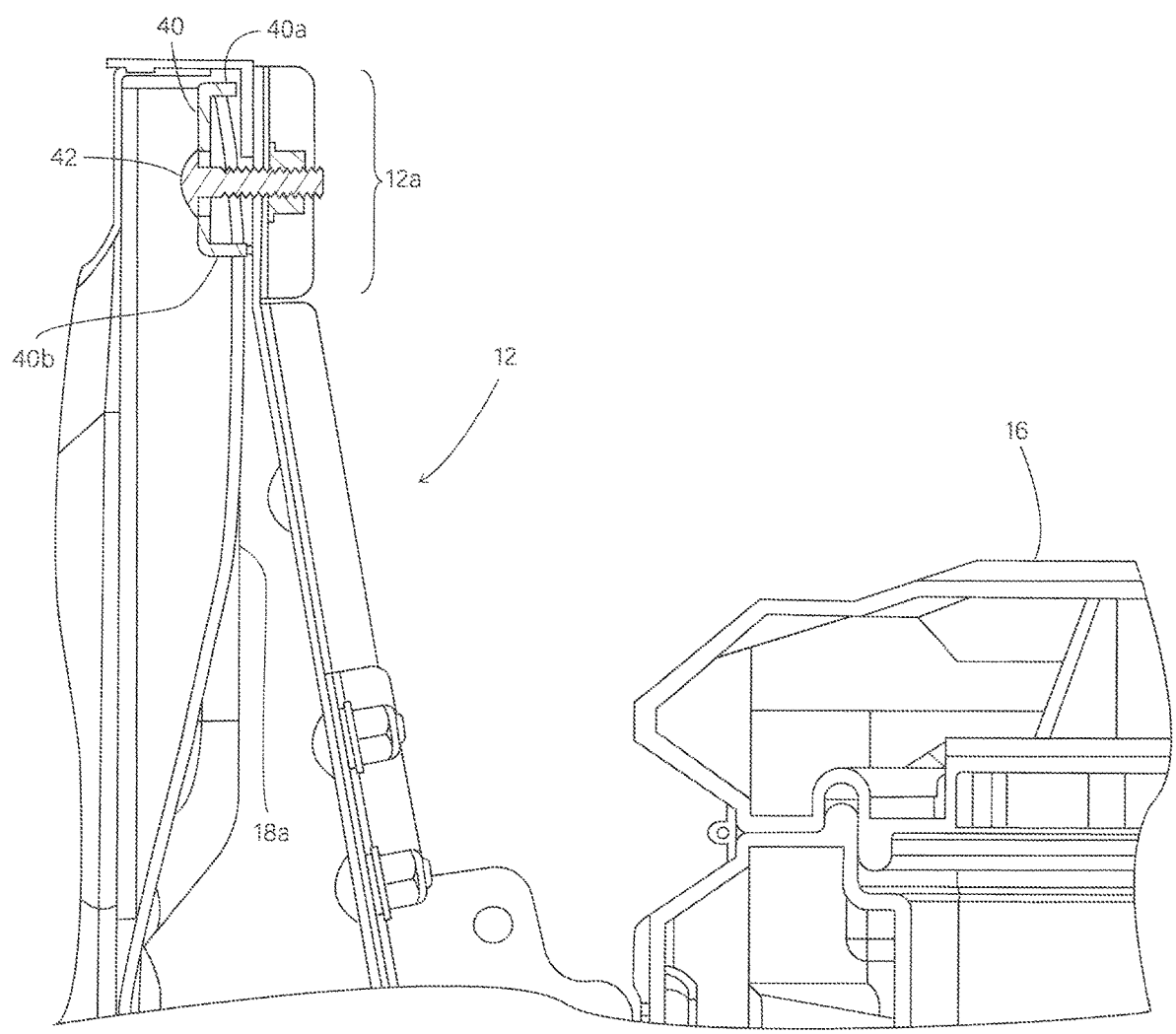
FIG. 4 is a side view of a portion of the mounting bracket of FIGS. 1-3 connected to a sidewall flange of the vehicle bed.

In particular examples, each bracket section 20, 22 and 24 has a generally plate-like configuration that has a front or first surface (facing outward of the page in FIG. 3), a rear or second surface (facing inward of the page in FIG. 3), two lateral or side edges (facing generally right-inward and left-outward of the page in FIG. 3), a top edge (facing upward on the page in FIG. 3), and a bottom edge (facing downward on the page in FIG. 3). The bracket sections 20, 22 and 24 are configured to be arranged adjacent and abutting each other, with the rear surface of the bracket section 22 facing and abutting the front surface of the bracket section 20, and with the rear surface of the bracket section 24 facing and abutting the front surface of the bracket section 22.

In that arrangement, the bracket section 20 is slideably moveable relative to the bracket 22, in the length dimension of the mounting bracket 12. In addition, the bracket section 24 is slideably moveable relative to the bracket section 22 in the length dimension of the mounting bracket 12. Accordingly, the length dimension of the mounting bracket 12 may be adjusted by manually sliding the bracket section 20 relative to the bracket section 22, or by manually sliding the bracket section 24 relative to the bracket section 22, or by sliding both of the bracket sections 20 and 24 relative to the bracket section 22. The mounting bracket 12 includes fasteners for fixing or setting the bracket sections 20, 22 and 24 together to inhibit further relative movement between the bracket sections, once the bracket sections are slid or otherwise moved into a desired adjusted relative position.

In certain examples, the lateral or side edge of each of the bracket sections 20, 22 and 24 has a flange or lip extending outward from the front surface of the bracket section. More specifically, the bracket section 20 has flanges 20a and 20b on its left and right side edges, respectively. In addition, the bracket section 22 has flanges 22a and 22b on its left and right side edges, respectively, and the bracket section 24 has flanges 24a and 24b on its left and right side edges, respectively. In particular examples, the width dimensions of the bracket sections 20, 22 and 24 are selected or formed such that, when the bracket sections are arranged adjacent and abutting each other, the bracket section 22 fits between the flanges 20a and 20b of the bracket section 20, and the bracket section 24 fits between the flanges 22a and 22b of the bracket section 22. The flanges on the bracket sections 20, 22 and 24 can help guide the sliding movement of the bracket sections relative to each other, for example, in a linear direction along the length dimension of the mounting bracket 12.

In certain examples at least two of the bracket sections 20, 22 and 24 have one or more elongated, slot-shaped openings extending along a portion of the length dimension of the bracket section and one or more of the bracket sections may have round (not slot-shaped) openings, through which fasteners may extend when the bracket sections 20, 22 and 24 are arranged adjacent and abutting each other. For example, the bracket section 20 may have one or more (three in the illustrated embodiment) first elongated slot-shaped openings 20c on one side of the bracket section 20, and one or more (three in the illustrated embodiment) second elongated slot-shaped openings 20d on the other side of the bracket section 20. The first elongated slot-shaped openings 20c may be located adjacent but spaced from and parallel to the side flange 20a, while the second elongated slot-shaped openings 20d may be located adjacent, but spaced from and parallel to the side flange 20b.

In addition, the bracket section 22 may have one or more (two in the illustrated embodiment) first round openings 22c on one side of the bracket section 22 (and located adjacent, but spaced from the side flange 22a), and one or more (two in the illustrated embodiment) second round openings 22d on the other side of the bracket section 22 (and located adjacent, but spaced from the side flange 22b). The first and second round openings 22c and 22d in the second bracket section 22 are arranged to align with one or more of the elongated slot-shaped openings 20c and 20d in the first bracket section 20, when the first and second bracket sections 20 and 22 are arranged adjacent and abutting each other.

The second bracket section 22 also has one or more (one in the illustrated embodiment) first elongated slot-shaped openings 22e on one side of the bracket section 22, and one or more (one in the illustrated embodiment) second elongated slot-shaped openings 22f on the other side of the bracket section 22. The first elongated slot-shaped openings 22e may be located adjacent but spaced from and parallel to the side flange 22a, while the second elongated slot-shaped openings 22f may be located adjacent, but spaced from and parallel to the side flange 22b.

The third bracket section 24 also has one or more (two in the illustrated embodiment) first round openings 24c on one side of the bracket section 24, and one or more (two in the illustrated embodiment) second round openings 24d on the other side of the bracket section 22. The elongated slot-shaped openings 24c and 24d in the third bracket section 24 are arranged to align with one or more of the elongated slot-shaped openings 22e and 22f in the second bracket section 22, when the second and third bracket sections 22 and 24 are arranged adjacent and abutting each other. In other examples, the third bracket section 24 may have one or more elongated slot-shaped openings in place of the round openings 24c and 24d (similar to the openings 22e and 22f).

When the first, second and third bracket sections 20, 22 and 24 are arranged adjacent and abutting each other, the first and second bracket sections 20 and 22 may be slid relative to each other to align the elongated slot shaped openings 20c and 20d in the first bracket section 20 with the round openings 22c and 22d in the second bracket section 22, respectively. The aligned openings 20c and 22c provide one or more (two in the illustrated embodiment) through holes through the bracket body of the mounting bracket 12 for receiving one or more (two in the illustrated embodiment) first fasteners 30. Similarly, the aligned openings 20d and 22d provide one or more (two in the illustrated embodiment) through holes through the bracket body of the mounting bracket 12 for receiving one or more (two in the illustrated embodiment) additional first fasteners 30.

Similarly, the second and third bracket sections 22 and 24 may be slid relative to each other to align the elongated slot shaped openings 22e and 22f in the second bracket section 22 with the round openings 24c and 24d in the third bracket section 24, respectively. The aligned openings 22e and 24c provide one or more (two in the illustrated embodiment) through holes through the bracket body of the mounting bracket 12 for receiving one or more (two in the illustrated embodiment) second fasteners 32. Similarly, the aligned openings 22f and 24d provide one or more (two in the illustrated embodiment) through holes through the bracket body of the mounting bracket 12 for receiving one or more (two in the illustrated embodiment) additional second fasteners 32.

In certain examples, each of the first fasteners 30 has a shaft portion that extends through the aligned elongated slot-shaped opening and round opening in the two adjacent bracket sections 20 and 22, and a head portion that does not pass through those openings. Similarly, each of the second fasteners 32 has a shaft portion that extends through the aligned elongated slot-shaped opening and round opening in the two adjacent bracket sections 22 and 24, and a head portion that does not pass through those openings. In certain examples, the shaft portion of each of the first and second fasteners 30 and 32 may be threaded for threading engagement with a nut or other threaded member 30a and 32a, respectively.

In particular, the first fasteners 30 may be arranged to extend through the elongated slot-shaped openings 20c and 20d and the round openings 22c and 22d in the bracket sections 20 and 22, with the head portion of each fastener located on and adjacent the rear side of the first bracket section 20, and the nut or other threaded member 30a located on or adjacent the front side of the second bracket section 22. In certain examples, one or more washers may be provided on the shaft portion of each of the first fasteners 30, for example, between the nut or other threaded member 30a and the front surface of the second bracket section 22. Similarly, the second fasteners 32 may be arranged to extend through the elongated slot-shaped openings 22e and 22f in the second bracket section 22, and the round openings 24c and 24d in the third bracket section 24, with the head portion of each fastener 32 located on and adjacent the rear side of the second bracket section 22, and the nut or other threaded member 32a located on or adjacent the front side of the third bracket section 24. One or more washers may be provided on the shaft portion of each of the second fasteners 32, for example, between the nut or other threaded member 32a and the front surface of the third bracket section 24.

In the above-described arrangement, the first fasteners 30 and nuts or threaded members 30a may be threadingly connected to connect the first and second bracket sections 20 and 22, together. However, the first fasteners 30 may be sufficiently loosened to allow the first bracket section 20 to slide relative to the second bracket section 22, while the shaft portions of the first fasteners 30 are held in the round openings 22c and 22d of the second bracket section 22, but slide or move along the length dimension of the elongated slot-shaped openings 20c and 20d in the first bracket section 20. Accordingly, the first and second bracket sections 20 and 22 may be adjusted relative to each other, to adjust the length dimension of the mounting bracket 12, in the direction between the bottom end of the second bracket section 22 and the top end of the first bracket section 20.

Similarly, the second fasteners 32 and nuts or threaded members 32a may be threadingly connected to connect the second and third bracket sections 22 and 24, together. However, the second fasteners 32 may be sufficiently loosened to allow the third bracket section 24 to slide relative to the second bracket section 22, while the shaft portions of the second fasteners 32 slide or move along the length dimension of the elongated slot-shaped openings 22e and 22f in the second bracket section 22 and are held in the round openings 24c and 24d in the third bracket section 24. Accordingly, the second and third bracket sections 22 and 24 may be adjusted relative to each other, to adjust the length dimension of the mounting bracket 12, in the direction between the top end of the second bracket section 22 and the bottom end of the third bracket section 24.

Therefore, in the illustrated embodiment, the length dimension of the mounting bracket 12 may be adjusted in an upward direction (by sliding the first bracket section 20 upward relative to the second bracket section 22), and in a downward direction (by sliding the third bracket section 24 downward relative to the second bracket section 22). The adjusted length of the bracket 12 may be fixed or set, by tightening the first and second fasteners 30 and 32 (such as, by tightening the threaded engagement of the fasteners 30 and 32 with the nuts or other threaded members 30a and 32a) by an amount sufficient to inhibit sliding motion between the first, second and third bracket sections 20, 22 and 24. In other examples, other suitable adjustable connection fasteners or configurations for allowing adjustment of the length dimension of the mounting bracket 12 and fixing the mounting bracket 12 at an adjusted length.

In certain embodiments, one or more (or each) of the bracket sections 20, 22 and 24 may include position defining features for defining one or more adjustment positions. In particular examples, the one or more position defining features include one or more protrusions (ribs or other protrusions) on one or more of the bracket sections, and one or more recesses or openings on another one of the bracket sections that receive the one or more protrusions. For example, in the illustrated embodiment, the first bracket section 20 includes a plurality of protrusions or ribs 20e that extend outward toward the second bracket section 22. In addition, the second bracket section 22 includes a plurality of recesses or openings (on the opposite side of the bracket section 22 of the protrusions or rib features 22g shown in FIG. 3), for receiving one or more of the protrusions or ribs 20e on the first bracket section 20.

The one or more of the protrusions or ribs 20e on the first bracket section 20 are configured and arranged to be received in the one or more recesses on the second bracket section 22, when the first and second bracket sections 20 and 22 are slid or moved to a first defined position relative to each other (to set the bracket sections to define a first length from the upper end of the first bracket section 20 to the lower end of the second bracket section 22). In certain examples, the first bracket section 20 may include one, two or more than two protrusions or ribs 20e (two shown in the illustrated example) and the second bracket section 22 may include one, two or more than two recesses for receiving one or more of the protrusions or ribs 20e. In examples in which the first and second bracket sections 20 and 22 include a plurality of protrusions or ribs, or a plurality of recesses or openings (or both protrusions/ribs and recesses/openings), the bracket sections may have a plurality of defined positions that can be set, by sliding or moving the bracket sections relative to each other until one or more protrusions or ribs are received in one or more recesses. Once one or more of the protrusions or ribs in the first bracket section 20 are received in one or more of the recesses or openings in the second bracket section 22, the fasteners 30 may be tightened, to fix or set the bracket sections 20 and 22 relative to each other. In other examples, the relative positions of the protrusions or ribs and the recesses or openings may be reversed, such that the second bracket section 22 may include one or more protrusions or ribs that extend outward toward the first bracket section 20 and are configured to be received in one or more recesses or openings in the first bracket section 20.

In further examples, the second bracket section 22 also includes one or more protrusions or ribs 22h (one shown in the illustrated example) that extend outward toward the third bracket section 24. In addition, the third bracket section 24 includes one or more recesses or openings (not in view, but located on inward-facing surface of the third bracket section 24, in the orientation shown in FIG. 3). The one or more recesses or openings on the third bracket section 24 are configured to receive the one or more protrusions or ribs 22h, when the second and third bracket sections 22 and 24 are slid or moved to a first defined position relative to each other (to set the bracket sections to define a second length from the upper end of the second bracket section 22 to the lower end of the third bracket section 24). In examples in which the second and third bracket sections 22 and 24 include a plurality of protrusions or ribs, or a plurality of recesses or openings (or both protrusions/ribs and recesses/openings), the bracket sections may have a plurality of defined positions that can be set, by sliding or moving the bracket sections relative to each other until one or more protrusions or ribs are received in one or more recesses. Once one or more of the protrusions or ribs on the second bracket section 22 are received in one or more of the recesses or openings in the third bracket section 24, the fasteners 32 may be tightened, to fix or set the bracket sections 22 and 24 in position relative to each other. In other examples, the relative positions of the protrusions or ribs and the recesses or openings may be reversed, such that the third bracket section 24 may include one or more protrusions or ribs that extend outward toward the second bracket section 22 and are configured to be received in one or more recesses or openings in the second bracket section 22.

Accordingly, in particular embodiments, the length dimension of the mounting bracket 12 may be set to one or more pre-defined lengths, by sliding or moving the first, second and third bracket sections 20, 22 and 24 to one or more positions relative to each other, in which the protrusions or ribs on one or more of the bracket sections are received in recesses or openings in one or more adjacent bracket sections. In such one or more positions, the fasteners 30 and 32 may be sufficiently tightened to fix the length dimension of the mounting bracket 12 to a set or defined length. In other examples, one or more (or each) of the first, second and third bracket sections 20, 22 and 24 include other features that define and set one or more selected lengths of the mounting bracket 12, when two or more of the bracket sections are slid or moved relative to each other to one or more defined positions corresponding to the selected length. In other examples, one or more (or each) of the first, second and third bracket sections 20, 22 and 24 do not include features (protrusions, ribs, recesses, openings or other features) that set defined lengths between ends of allowed adjustment movement and, instead, may slide or move to define any length between ends of the allowed movement of the bracket sections relative to each other.

In some examples, one or more of the first, second and third bracket sections 20, 22 and 24 has one or more apertures or holes to reduce weight and material of the bracket body. In some examples, one or more of the first, second and third bracket sections 20, 22 and 24 has one or more protrusions or recesses for guiding sliding movement of the adjacent bracket sections, or for reducing contact between adjacent bracket sections during sliding movement. In some examples, the second bracket section 22 includes one or more recessed regions on one side (e.g., the side facing the first bracket section 20, or the side facing the third bracket section 24) and also includes one or more protrusions or ribs formed as the reverse shape or impression that defines the one or more recesses on the opposite side of the bracket section (e.g., the side facing the third bracket section 24, or the side facing the first bracket section 20), such that the same structural feature that forms the recess on one side of the bracket section also forms the protrusion or rib on the opposite side of the bracket section.

Accordingly, in examples described herein, the mounting bracket 12 has a length dimension that is adjustable to any suitable length (or to one or more predefined lengths) between the ends of the allowed sliding movement of the bracket sections 20, 22 and 24 relative to each other. In particular examples, the mounting bracket 12 is configured to be adjustable in its length dimension, at least to a length at which a bottom end of the third bracket section 24 engages the floor 18*b* of the vehicle bed 18.

The second bracket section 22 selectively connects with one or more container brackets 26 and 28 on the container 16, through one or more second connection joints. In particular examples, one of the second connection joints includes one or more (two in the illustrated embodiment) flanges or ears 22*i* and 22*j* on one side (the left side in FIGS. 2 and 3) and another second connection joints includes one or more (two in the illustrated embodiment) flanges or ears 22*k* and 22*l* on the opposite side (the right side in FIGS. 2 and 3). In particular examples, the flange or ear 22*i* is an extension of the side flange 22*a* and extends further outward from the rest of the side flange 22*a*, and the flange extension or ear 22*l* is an extension of the side flange 22*b* and extends further outward from the rest of the side flange 22*b*. The flanges or ears 22*j* and 22*k* may extend outward from the second bracket section 22 in the same direction as (e.g., generally parallel to) the flange extensions 22*i* and 22*l*, but are spaced apart from the flange extensions 22*i* and 22*l* by a gap or distance of sufficient width to receive a flange portion of a container bracket 26 or 28, as described below.

In certain examples, each of the flange extensions or ears 22*i*, 22*j*, 22*k* and 22*l* includes a pin aperture 22*m* for receiving a pin 34 or 36, as described below. The aperture pin 22*m* on each of the flanges 22*i* and 22*k* is in view in FIG. 3. In addition, the flange 22*j* has a corresponding aperture (hidden from view in FIG. 3) that is aligned with the pin aperture 22*m* in the flange 22*i*, to receive the pin 34. Similarly, the flange 22*l* has a corresponding aperture (hidden from view in FIG. 3) that is aligned with the pin aperture 22*m* in the flange 22*k*, to receive the pin 36.

In addition, one or more, or each of the flanges or ears 22*i*, 22*j*, 22*k* and 22*l* may include a further aperture for receiving a portion of a padlock or other locking mechanism, as described below. In the illustrated example, one of the flange extensions or ears (e.g., ear 22*j*) on one side (e.g., the left side) of the second bracket section 22 and one of the flange extensions or ears (e.g., ear 22*k*) on the other side (e.g., the right side) of the second bracket section 22 includes the further aperture 22*n* for receiving a portion of a padlock or other locking mechanism, as described below.

A shaft 23 is fixed to a bottom portion of each of the flanges or ears 22*i* and 22*j*, and extends across the gap between those flanges 22*i* and 22*j*. Similarly, a shaft 25 is fixed to a bottom portion of each of the flanges or ears 22*k* and 22*l*, and extends across the gap between those flanges 22*k* and 22*l*. The shaft 23 and 25 are configured to be received within a slot feature provided in the container brackets 26 and 28 and at least partially support the container 16, when the container 16 is connected to the mounting bracket 12, as described below.

In particular examples, the third bracket section 24 includes one or more foot portions 24*e* and 24*f* for engaging or interfacing with a surface of the floor 18*b* of the vehicle bed 18. In certain examples, each foot portion 24*e* and 24*f* may include or be connected with a shoe 24*g* and 24*h*, respectively. The shoes 24*g* and 24*h* may connect with the foot portions 24*e* and 24*f*, respectively, in any suitable manner including, but not limited to glue, welding or other adhesives, friction fit, crimped connection, molding, co-molding, machining, combinations thereof, or the like. In certain examples, each shoe 24*g* and 24*h* may provide an enhanced friction surface (including rubber, plastic, or other friction-enhancing material, shapes or contours or other friction enhancement features or combinations thereof) for enhancing frictional engagement of the mounting bracket 12 with the floor 18*b* of the vehicle bed 18. In certain examples, each shoe 24*g* and 24*h* is made of a material or configuration for enhancing the strength or durability of the engagement ends of the foot portions 24*e* and 24*f*. In certain examples, each shoe 24*g* and 24*h* is made of a configuration or material (such as, but not limited to a rubber, plastic, leather or other suitable material, or combinations thereof) for minimizing abrading or damaging the floor 18b of the vehicle bed 18, when the foot portions 24e and 24f of the mounting bracket 12 engage the floor 18b vehicle bed 18.

Figure 2:
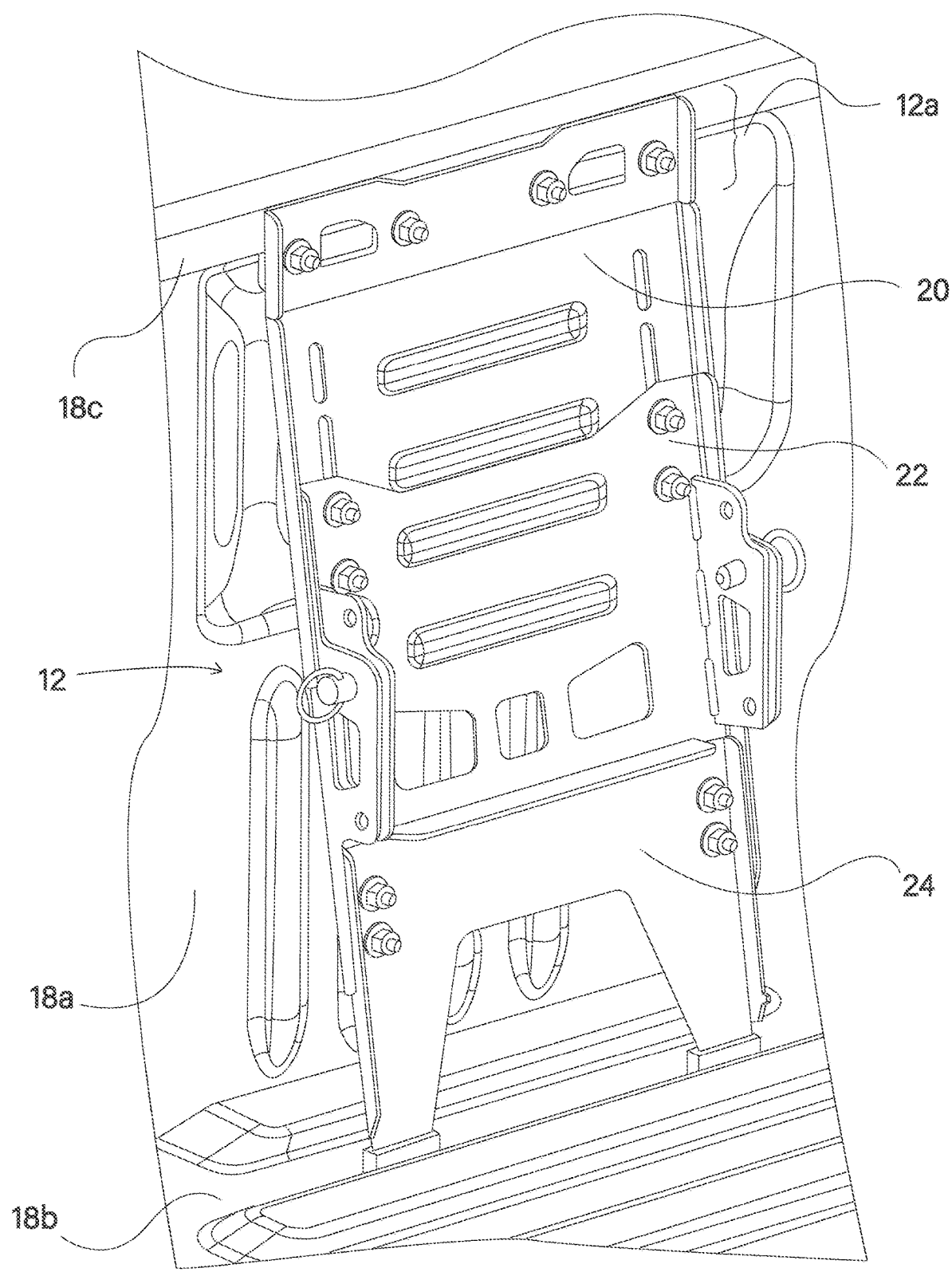
FIG. 2 is perspective view of a mounting bracket of the mounting system of FIG. 1, attached to a sidewall of the vehicle bed, according to an exemplary embodiment.

In particular examples, the first bracket section 20 includes one or more features for interfacing and connecting to a sidewall 18a of the vehicle bed 18. In the illustrated example, the first bracket section 20 includes a first end portion (corresponding to the first end portion 12a of the mounting bracket 12) that is at an angle (of between about 0.5° and about 45°) relative to the main portion of the first bracket section 20 (the portion that engages and can slide or move adjacent the second bracket section 22). The angle formed by the first bracket section 20 allows the mounting bracket 12 to be connected to a sidewall 18a of the vehicle bed 18, and angle outward from the sidewall 18a toward and into the interior of the vehicle bed 18, as shown in FIG. 2.

Mounting Configuration Examples

Figure 5:
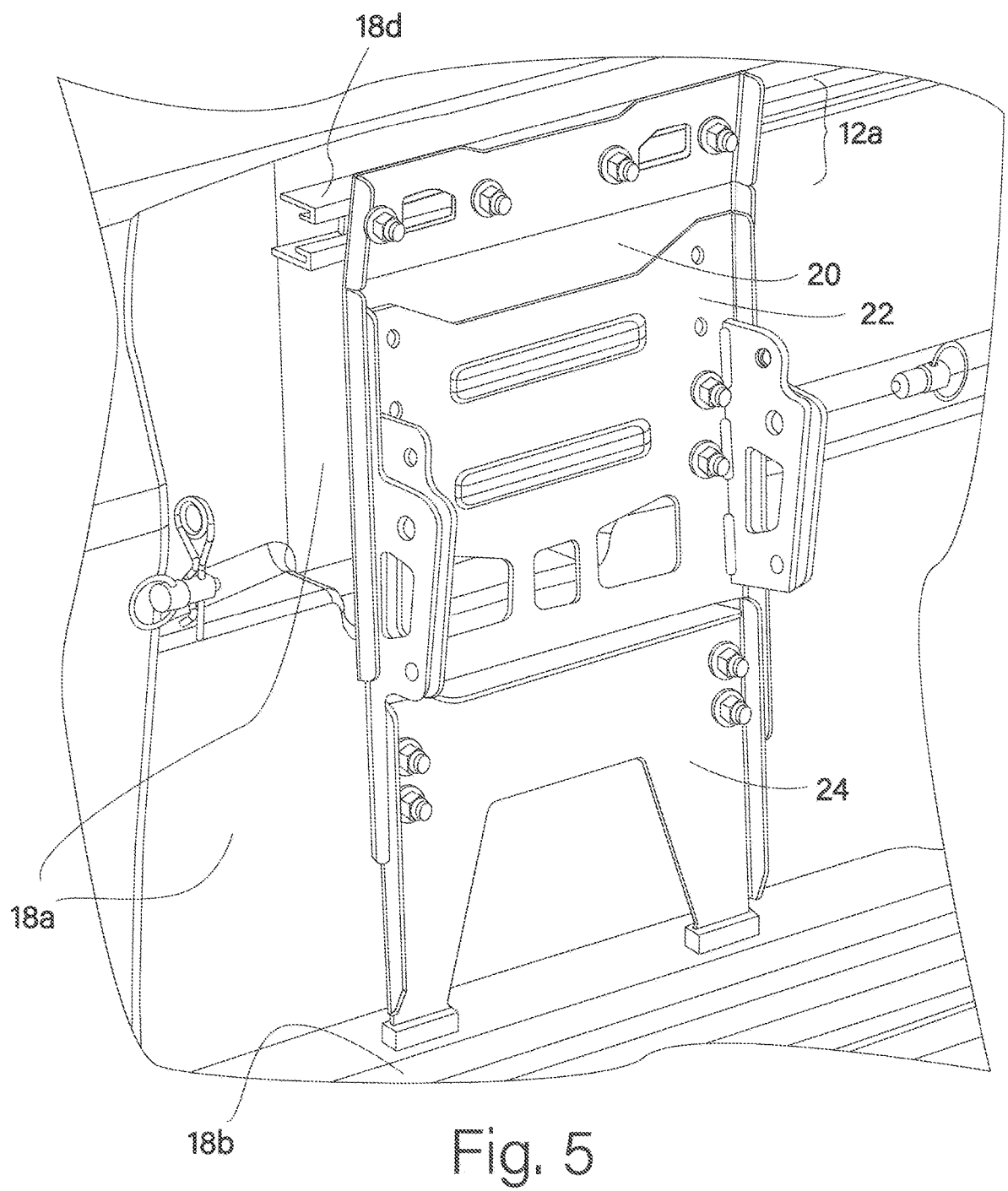
FIG. 5 is perspective view of another mounting bracket of a mounting system, attached to a sidewall of the vehicle bed, according to an exemplary embodiment.
Figure 6:
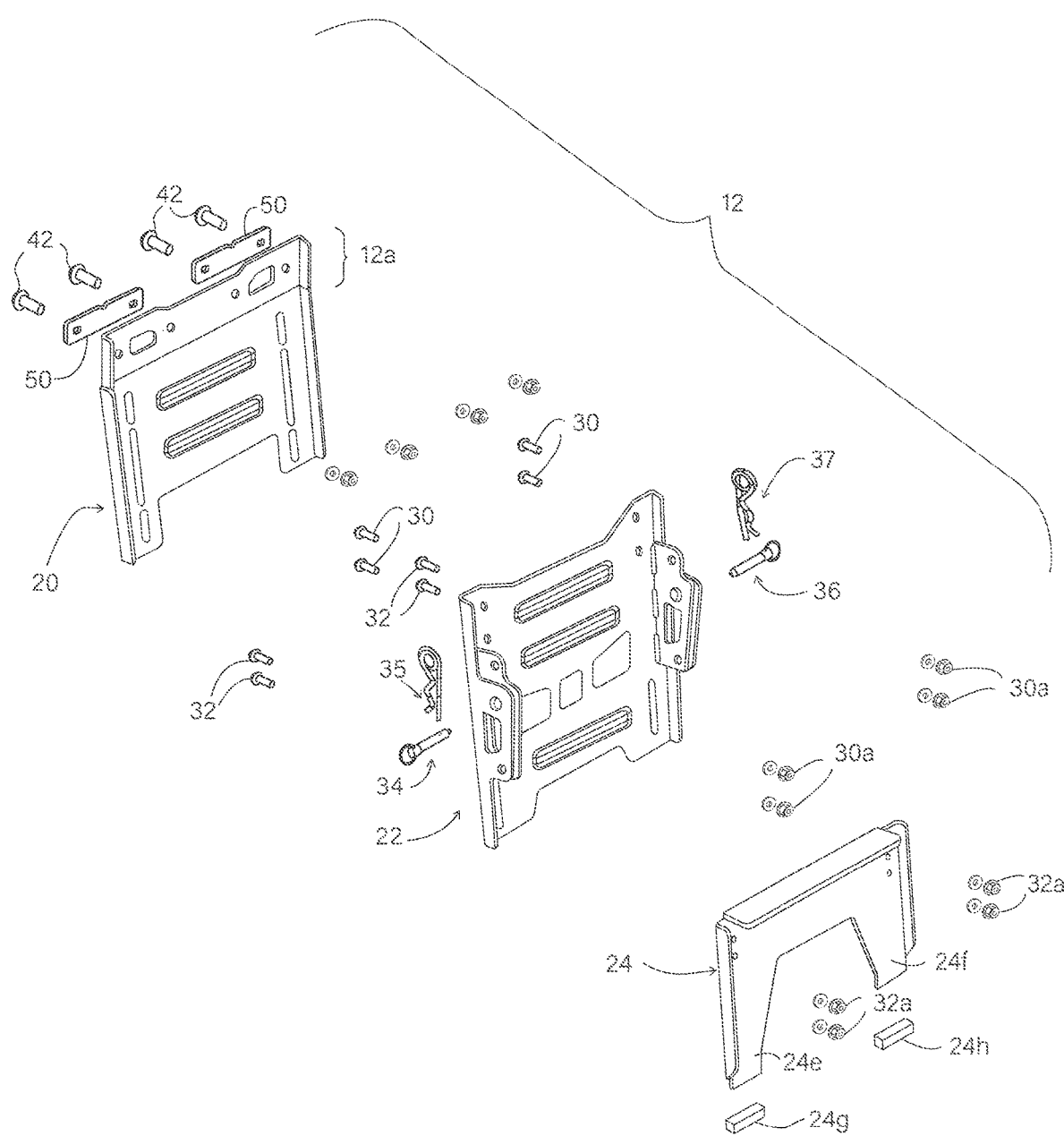
FIG. 6 is an exploded view of the mounting bracket of FIG. 5.
Figure 7:
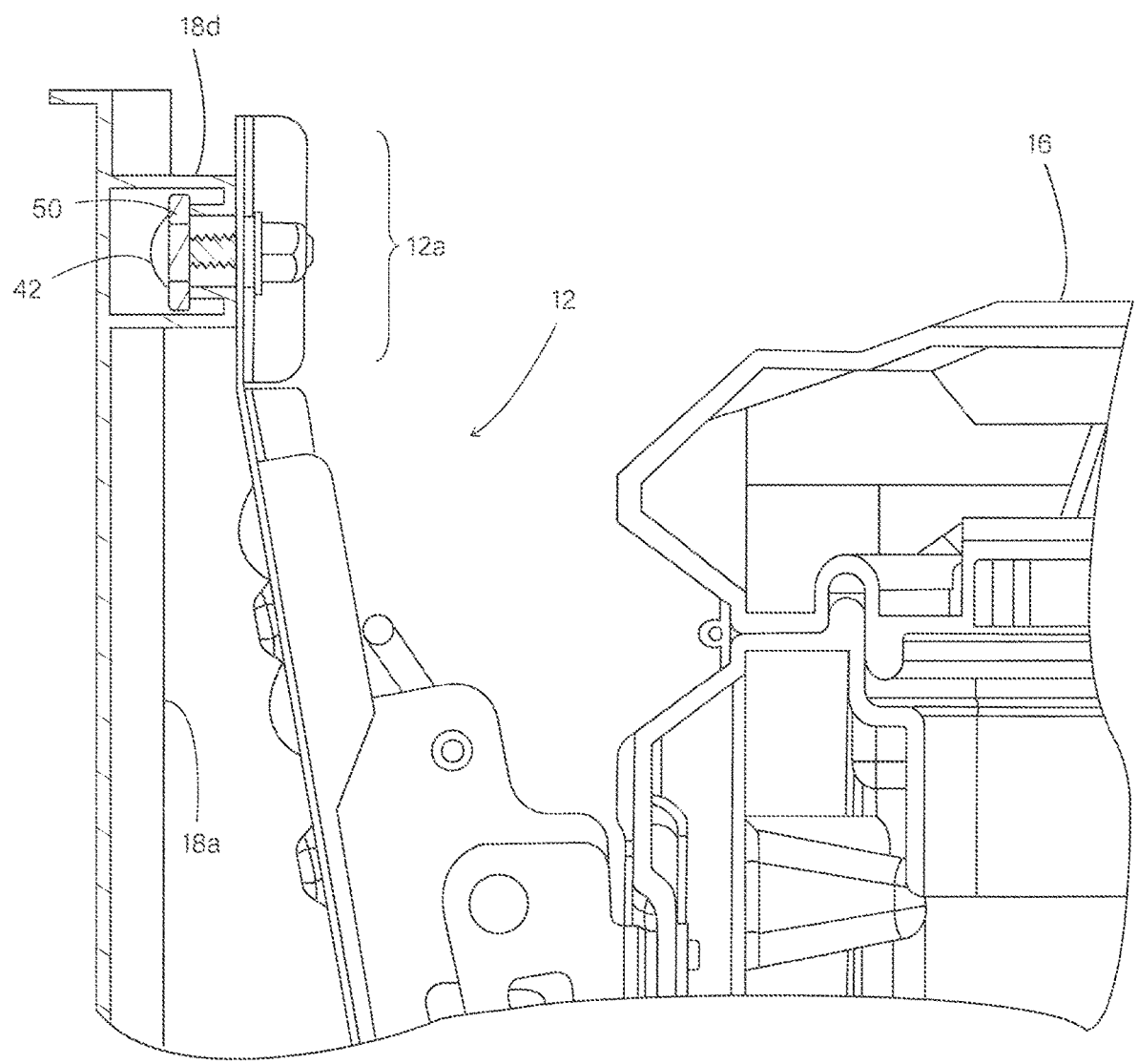
FIG. 7 is a side view of a portion of the mounting bracket of FIGS. 5-6 connected to a sidewall rail of the vehicle bed.

One example of a mounting configuration for securing the mounting bracket 12 to a sidewall 18a of a vehicle bed (or other installation) is shown in FIGS. 1-4, while another example of a mounting configuration for the mounting bracket 12 is shown in FIGS. 5-7. The first end portion of the first bracket section 20 of the mounting bracket 12 is configured to connect with one or more further bracket sections 40 for the mounting configuration in FIGS. 1-4, or with one or more further bracket sections 50 for the mounting configurations in FIGS. 5-7, respectively.

In particular examples, one or more (or a plurality of) fasteners 42 connect the first end portion of the first bracket section 20 with either the further bracket members 40 or 50. Each of the examples in FIGS. 3 and 6 include two further bracket members 40 or 50. Other examples may include one further bracket member or more than two further bracket members.

In the example in FIGS. 1-4, the mounting bracket 12 has a size and shape to mount to a ledge or flange provided on the upper edge of the sidewalls of certain vehicle beds (or other installation locations). In certain examples, the ledge or flange is a standard ledge 18c provided on the sidewalls 18a of certain Ford pickup truck beds or other vehicle beds (or other installation locations).

In the example in FIGS. 1-4, the one or more further bracket sections 40 are configured to be located and held on one side of the flange or lip 18c, while the mounting bracket 12 is located adjacent to the other side of the flange or lip 18c (i.e., the side facing the interior of the bed 18). The one or more fasteners 42 are configured to be selectively loosened to allow the position of the mounting bracket 12 and the one or more further bracket sections 40 to be connected together, but moved and adjusted, together, along the length of the flange or lip 18c, and selectively tightened to lock or fix the position of the mounting bracket 12 and the one or more further bracket sections 40 on the flange or lip 18c. In certain examples, each of the one or more fasteners 42 includes a threaded fastener, such as, but not limited to a threaded bolt or screw and a nut or other threaded member. In certain examples, each fastener 42 has a threaded shaft portion that extends through an opening in one or each of the mounting bracket 12 and the further bracket section(s) 40, and threadingly engages a nut or other threaded member on one side of the mounting bracket 12 (or of each further bracket section 40). In other examples, other suitable fasteners may be employed for selectively fastening the mounting bracket 12 and the one or more further bracket sections 40 together, with the flange or lip 18c located between the mounting bracket 12 and the one or more further bracket sections 40.

In the illustrated example, each of the further bracket sections 40 includes an upper lip 40a and a lower lip 40b. In particular examples, the lower lip 40b extends outward a greater distance than the upper lip 40a. In some examples, the difference in distance of extension of the lips 40a and 40b is approximately equal to the thickness of the flange or lip 18c. When the mounting bracket 12 is installed on a flange or lip 18c of a sidewall 18a of a vehicle bed (as shown in FIGS. 1 and 2, the upper lip 40a extends outward toward and contacts a surface of the flange or lip 18c of the sidewall 18a of the vehicle bed, and the lower lip 40b extends outward toward and contacts the rear surface of the mounting bracket 12. In that arrangement, the fasteners 42 may be tightened to secure the mounting bracket 12 and the one or more further bracket sections 40 in a fixed position along the flange or lip 18c of the sidewall 18a of the vehicle bed.

In another example, as shown in FIGS. 5-7, each of the further bracket members 50 has a size and shape to fit inside of and slide along a standard mounting rail 18d that is provided along at least a portion of the length of each of the sidewalls of certain vehicle beds (or other installation locations). In certain examples, the mounting rail 18d is a standard mounting rail provided on the sidewall 18a of a vehicle bed 18, such as, but not limited to the standard mounting rail provided on certain Toyota pickup truck beds.

In the example in FIGS. 5-7, the one or more further bracket members 50 are configured to be located and held within a rail 18d, while the mounting bracket 12 is configured to be located adjacent to, but outside of the rail 18d, and connected to the one or more further bracket members 50 via the fasteners 42. In certain examples, each of the one or more fasteners 42 includes a threaded fastener, such as, but not limited to a threaded bolt or screw, and is configured to threadingly engage a nut or other threaded member 42a, as described above. In certain examples, each fastener 42 has a threaded shaft portion that extends through an opening in one or both of the upper end portion of the mounting bracket 12 and in one of the further bracket members 50, and threadingly engages a nut or other threaded member 42 on one side of the mounting bracket 12 (or of one of the further bracket members 50). In other examples, other suitable fasteners may be employed for selectively fastening the mounting bracket 12 to the one or more further bracket members 50, with a portion of the rail 18d between the mounting bracket 12 to the one or more further bracket members 50.

Accordingly, the fasteners 42 are configured to connect the mounting bracket 12 to the one or more further bracket members 50, with a portion of the rail 18d between the mounting bracket 12 and the further bracket members 50. However, the one or more fasteners 42 are configured to be selectively loosened to allow the position of the mounting bracket 12 and the one or more further bracket members 50 to be moved and adjusted, together, along the length of the rail 18d. The one or more fasteners 42 are configured to be selectively tightened to lock or fix the position of the mounting bracket 12 and the one or more further bracket members 50 on the rail 18d.

Container Brackets

Figure 8:
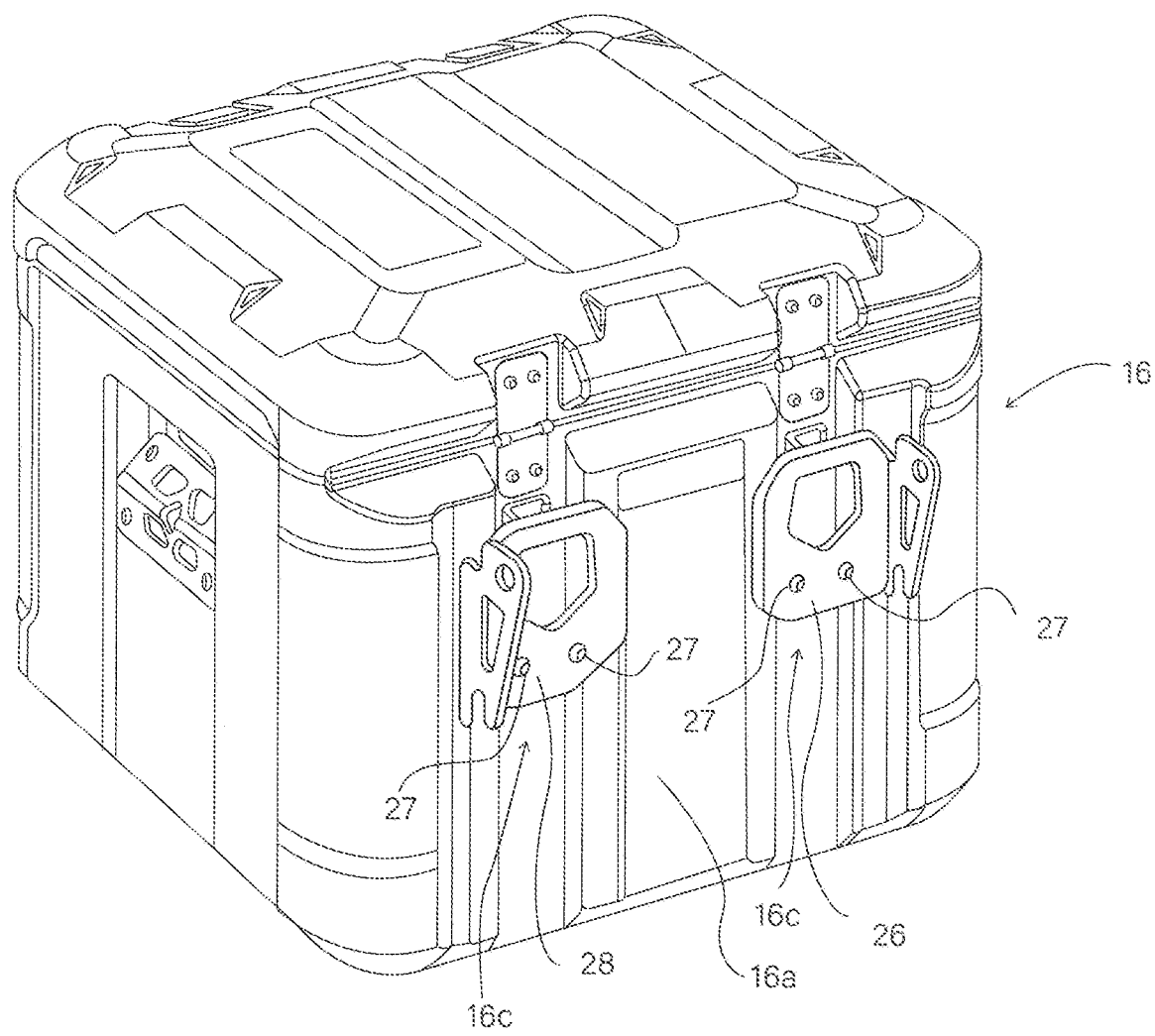
FIG. 8 is a perspective view of a container having container brackets for connecting to the mounting brackets of FIGS. 1-7.

The container brackets 26 and 28 are configured to selectively connect the container 16 to the mounting bracket 12, through the one or more second connection joints. In the illustrated examples, the container brackets 26 and 28 have an identical, but mirror or reverse-facing (from right-to-left) configurations such that details described and shown for container bracket 26 also apply to the container bracket 28. In each of the examples in FIGS. 8 and 9, the container brackets 26 and 28 are provided on a side wall 16a of a container 16. The container 16 in FIG. 8 is smaller than the container 16 in FIG. 9. In particular examples, the same container brackets 26 and 28 may be employed for the smaller or the larger size containers 16.

In the examples of FIGS. 8-12, the container brackets 26 and 28 are shown as coupled to a side wall of the container 16 (e.g., the side of the container 16 that faces the sidewall 18a of the vehicle bed 18 in FIG. 1). The container brackets 26 and 28 may include or operate with one or more (or a plurality of) fasteners 27 for fixing the container brackets 26 and 28 to a side wall of the container 16.

Figure 10:
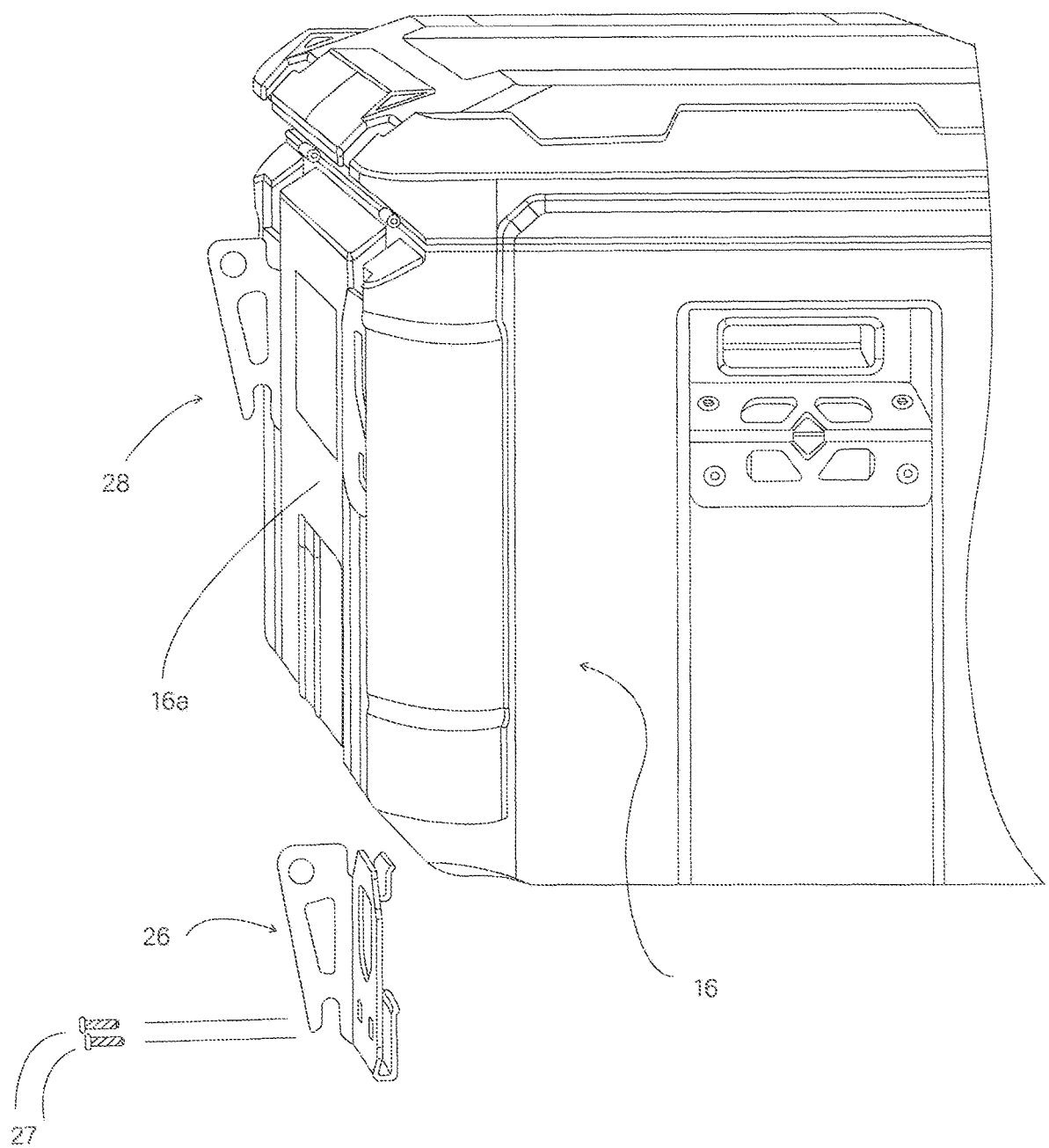
FIG. 10 is a perspective view of a portion of a container and container brackets of FIGS. 8 and 9.
Figure 11:
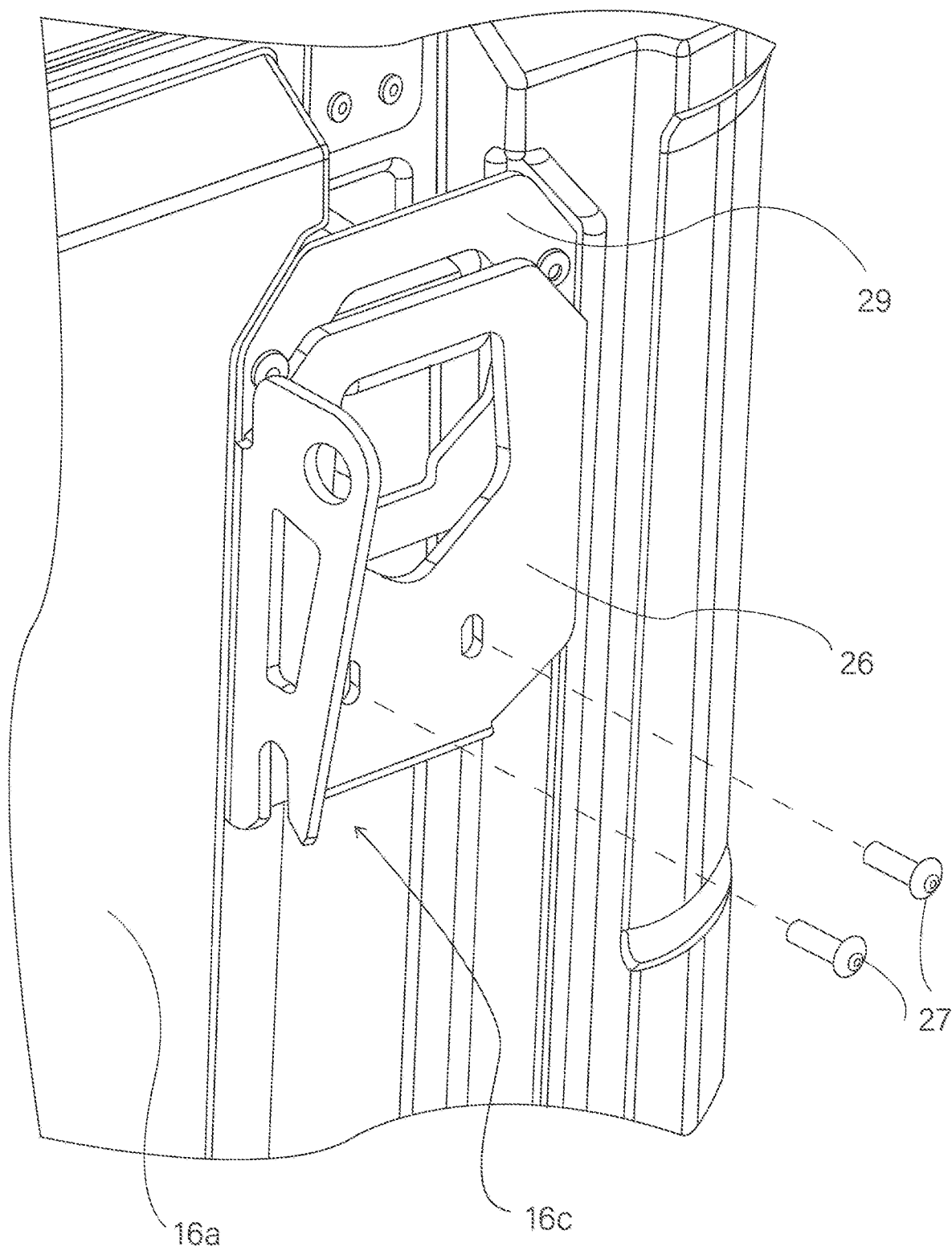
FIG. 11 is a perspective view of a portion of a container and a container bracket during installation of the container bracket onto the container.
Figure 12:
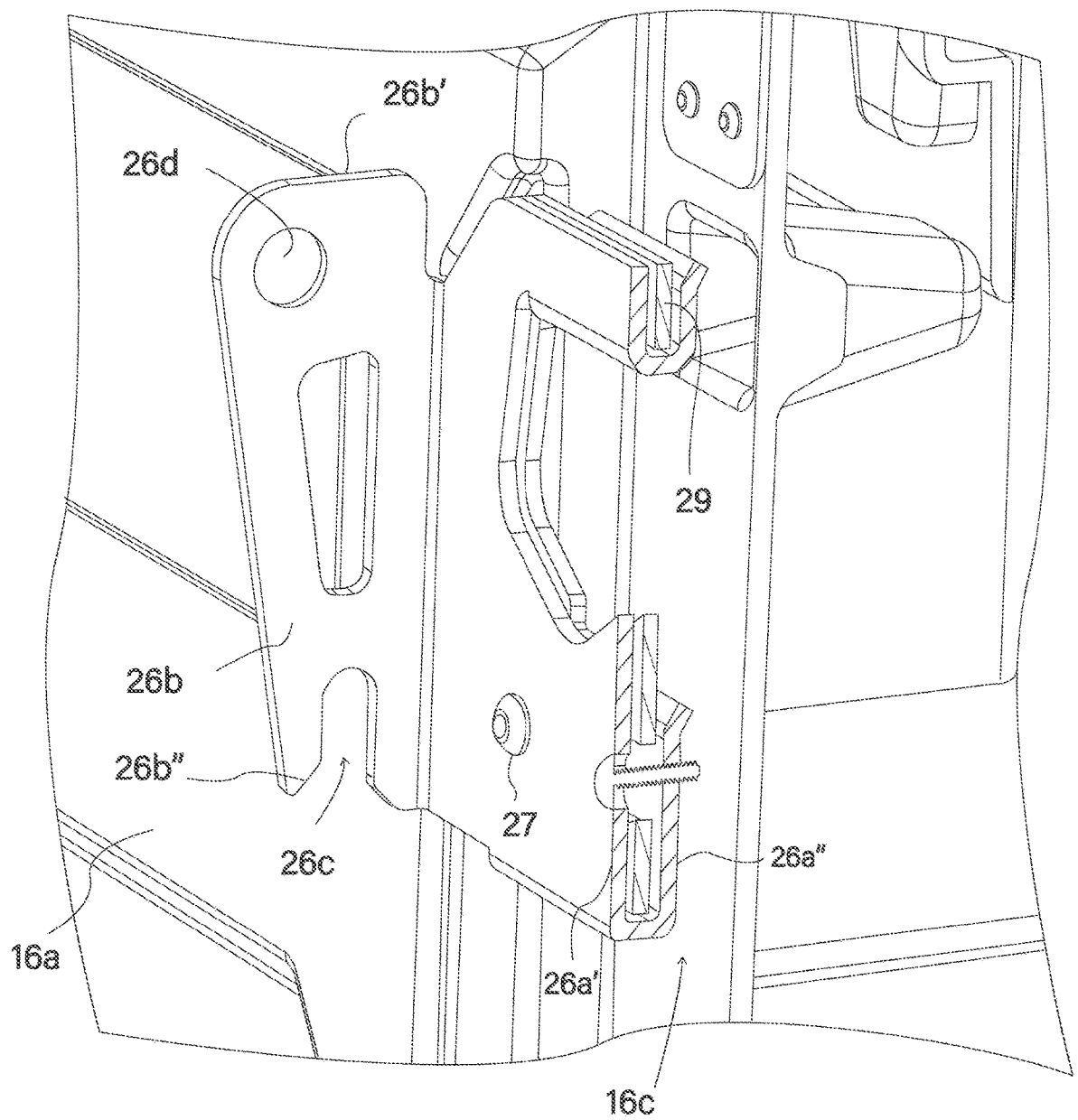
FIG. 12 is a partial cut-away, perspective view of a container bracket and a portion of a container.

With reference to FIGS. 10-12, further details of an example of the container bracket 26 are described. Similar descriptions apply to the container bracket 28. The container bracket 26 in FIGS. 10-12 includes a rear section 26a and a flange or ear 26b that extends outward from the rear section 26a. In certain examples, the flange or ear 26b has an upper end 26b', a lower end 26b", and a tapered or angled shape such that the upper end 26b' extends outward from the rear section 26a by a greater distance that is greater than the distance by which the lower end 26b" extends from the rear section 26a. Accordingly, the upper end 26b' of the flange or ear 26b is larger or wider than the lower end 26b" of the flange or ear 26 (in the dimension or distance that it extends from the rear section 26a and the side wall of the container 16). As described below, the angled or tapered shape of the container bracket 26 can simplify an installation method, in which the container 16 is installed on and connected to the mounting bracket 12.

In particular examples, the flange or ear 26b includes a slot or channel 26c extending upward, from its lower end 26b". The slot or channel 26c has a size and shape sufficient to receive a portion of the shaft 23 (or the shaft 25), when the container 16 is installed onto the mounting bracket 12, as described below. In those or other examples, the flange or ear 26b may further include a hole or aperture 26d toward its upper end 26b' of the flange or ear 26, where the hole or aperture 26d has a size and shape sufficient align with the further aperture 22n in the flange or ear 22j (or in the flange or ear 22k) and to receive a portion of a padlock or other locking mechanism, as described below, when the container 16 is connected to the mounting bracket 12 (and the shafts 23 and 25 are fully received within the slot or channel 26c of the container brackets 26 and 28). As shown in the illustrated example, the flange or ear 26b may also include one or more additional apertures or openings (one shown in the central region of the flange or ear 26b), for example, to reduce weight or materials.

In certain examples, as shown in FIGS. 10-12, the container bracket 26 includes or operates with a bracket plate 29 that is connected to the side wall 16a of the container 16 by suitable fasteners (permanent or removable fasteners), such as, but not limited to rivets, bolts, screws, adhesives, combinations thereof, or the like. Similarly, the container bracket 28 includes or operates with the bracket plate 29 or a second, similar bracket plate that is connected to the side wall 16a of the container 16 by similar fasteners. An example of bracket plates 29 is also shown in FIG. 1, on the side wall 16b of the container 16 facing opposite to the side wall 16a that connects to the mounting bracket 12. More specifically, in the embodiment in FIG. 1, the container 16 includes a pair of bracket plates 29 on each of two opposite facing side walls of the container (the side wall facing the mounting bracket 12 and the side wall facing outward and to the right side of the drawing), so that container brackets 26 and 28 may be selectively connected to either one of the two side walls of the container 16.

Figure 9:
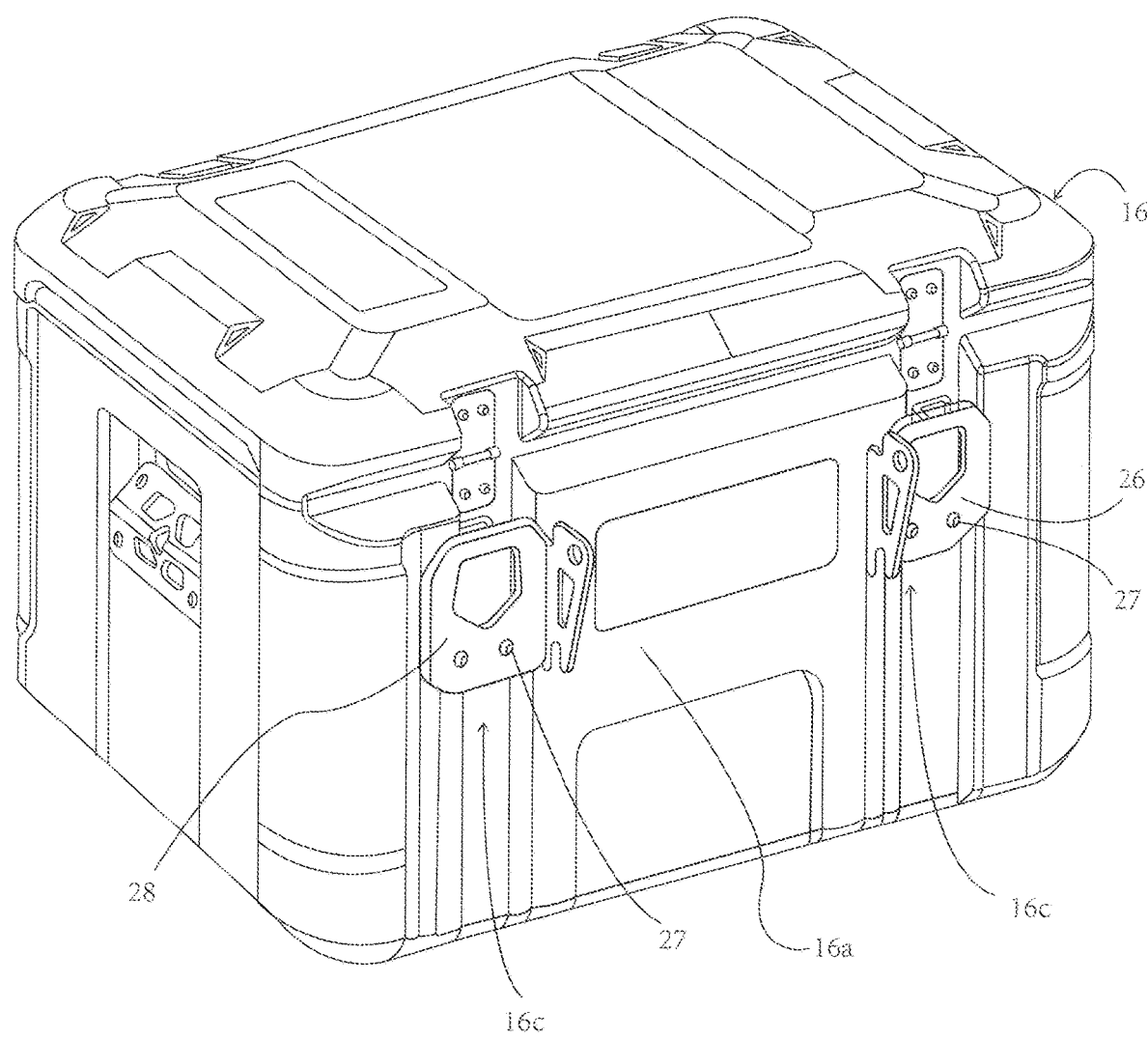
FIG. 9 is a perspective view of another container having container brackets for connecting to the mounting brackets of FIGS. 1-7.

The bracket plate 29 connects to the side wall 16a of the container 16, over and adjacent to a recessed region 16c on the side wall of the container, as shown in FIGS. 9 and 11. After the bracket plate 29 is connected to the side wall 16a of the container 16, the container bracket 26 may be connected to the bracket plate 29 by any suitable manner.

In certain examples, the rear section 26a of the container bracket 26 may have a U-shaped configuration, forming a front and back walls 26a' and 26a" of the rear section 26a, with a gap between the front and back walls 26a' and 26a". In such examples, the container bracket 26 connects to the bracket plate 29, by positioning the container bracket 26 at least partially in the recessed region 16c and adjacent (such as below) the bracket plate 29, as shown in FIG. 11, and then slid toward the container bracket 26 (e.g., upward, in the direction of arrow 31), to receive a portion of the bracket plate 29 between the front and back walls 26a' and 26a" of the container bracket 26. With the bracket plate 29 received within the gap between the front and rear walls 26a' and 26a" of the container bracket 26 as shown in FIG. 12, the container bracket fasteners 27 may be tightened to secure the container bracket 26 to the bracket plate 29 (and, thus, to the side wall 16a of the container 16). In certain examples, the bracket plate 29 includes one or more apertures through which the container bracket fasteners 27 extend, when securing the container bracket 26 to the bracket plate 29 (and to the side wall 16a of the container 16).

The container bracket fasteners 27 may be sufficiently engaged or tightened to secure the container bracket 26 to the bracket plate 29. The container bracket 28 may be connected to the bracket plate 29 (or second bracket plate) on the side wall 16a of the container 16 in a similar manner. In other examples, the container bracket 26 may be secured to the container 16 in other suitable manners, and with other suitable fastener configurations. In yet other examples, the container bracket 26 (or 28, or both) is secured to the container 16 during manufacture of the container 16, for example, by molding, forming or machining the container bracket 26 into the side wall (or other suitable location) on the container 16.

The mounting bracket 12, including first, second and third bracket sections 20, 22 and 24, may be formed of any suitable material or materials (such as, but not limited to metal, plastic, wood, composite material, combinations thereof, or the like) and by any suitable manufacturing process or processes (including, but not limited to molding, machining, casting, cutting, combinations thereof, or the like). The further bracket sections 40 and 50 may be formed of any suitable material or materials (such as, but not limited to metal, plastic, wood, composite material, combinations thereof, or the like) and by any suitable manufacturing process or processes (including, but not limited to molding, machining, casting, cutting, combinations thereof, or the like). The container brackets 26 and 28 and the bracket plate 29 may be formed of any suitable material or materials (such as, but not limited to metal, plastic, wood, composite material, combinations thereof, or the like) and by any suitable manufacturing process or processes (including, but not limited to molding, machining, casting, cutting, combinations thereof, or the like).

Installation Method

Example embodiments of a mounting system as described herein may be installed in a vehicle bed or other installation location in any suitable manner. In certain examples, a method of installation includes providing an adjustable-length mounting bracket 12. In particular examples, the method of providing a mounting bracket 12 may include connecting a plurality of bracket sections (such as, but not limited to, the bracket sections 20, 22 and 24) together for sliding or moving adjustment relative to each other, to allow adjustment of the length dimension of the mounting bracket 12.

The method further includes connecting the mounting bracket 12 on a sidewall 18*a* of a vehicle bed (or other installation location). In certain examples, the mounting bracket 12 may be connected to a sidewall 18*a*, by connecting the first end of the first bracket section 20 to the upper flange or lip 18*c* of the sidewall 18*a*. In examples in which the mounting bracket 12 connects to the upper flange or lip of the sidewall 18*a*, one or more further bracket sections 40 may be placed adjacent one side of the flange or lip 18*c*, and the first end of the bracket section 20 of the mounting bracket 12 may be arranged adjacent the other side of the flange or lip 18*c* (such that the flange or lip 18*c* of the sidewall 18 is located between the rear surface of the mounting bracket 12 and the one or more further bracket sections 40). In that arrangement, the one or more fasteners 42 may be arranged to connect the first end of the bracket section 20 of the mounting bracket 12 to the one or more further bracket sections 40, but remain sufficiently loose to allow the mounting bracket 12 and the one or more further bracket sections 40 to be moved, together, by manually sliding the mounting bracket 12 along the length dimension of the flange or lip 18*c*, to adjust the position of the mounting bracket 12 along a length or width dimension of the flange or lip 18*c* (and, thus, along a length or width dimension of the vehicle bed or other installation location). Once the mounting bracket 12 is located at an adjusted position along a length dimension of the upper flange or lip of the sidewall 18*a*, the one or more fasteners 42 may be tightened, to fix or set the mounting bracket 12 in its adjusted position.

Alternatively, the mounting bracket 12 may be connected to a sidewall 18*a*, by connecting the first end of the first bracket section 20 to the rail 18*d*, as described herein. In examples in which the mounting bracket 12 connects to a rail 18*d*, the one or more further mounting brackets 50 are arranged within the rail 18*d*, and the first end of the bracket section 20 of the mounting bracket 12 may be arranged adjacent the outside of the rail 18*d* (such that a portion of the sidewall rail 18*d* is located between the rear surface of the mounting bracket 12 and the one or more further bracket sections 50). In that arrangement, the one or more fasteners 42 may be arranged to connect the first end of the bracket section 20 of the mounting bracket 12 to the one or more further bracket sections 50, but remain sufficiently loose to allow the mounting bracket 12 and the one or more further bracket sections 50 to be moved, together, by manually sliding the mounting bracket 12 along the length dimension of the rail 18*d*, to adjust the position of the mounting bracket 12 along a length of the rail 18*d* (and, thus, along a length or width dimension of the vehicle bed or other installation location). Once the mounting bracket 12 is located at an adjusted position along a length dimension of the sidewall rail 18*d*, the one or more fasteners 42 may be tightened, to fix or set the mounting bracket 12 in its adjusted position. In other examples, other methods of connecting the mounting bracket 12 to the sidewall 18*a* may be employed.

Once the mounting bracket 12 is connected to a sidewall 18*a* of the vehicle bed (or other installation location), the length dimension of the mounting bracket 12 may be adjusted (for example, extended), until the shoes 24*g* and 24*h* of the foot portions 24*e* and 24*f* of the bracket section 24 contact and engage the floor 18*b* of the vehicle bed (or other installation location). In certain examples, the mounting bracket 12 is connected to the sidewall 18*a* and is adjusted to a length dimension in which the shoes 24*g* and 24*h* engage and abut against one or more ribs, grooves, indentations, projections or other features on (or fixed to) the floor 18*b* of the vehicle bed (or other installation location). In particular examples, the shoes 24*g* and 24*h* engage and press against the floor 18*b* (or features on the floor 18*b*) with sufficient force to retain the mounting bracket 12 in place and inhibit the mounting bracket 12 from swinging or pivoting away from or toward the sidewall 18*a* to which it is connected.

In certain examples, the length dimension of the mounting bracket 12 is adjusted by sliding or moving the first bracket section 20 and the second bracket section 22 relative each other, and by sliding or moving the third bracket section 24 and the second bracket section 22 relative to each other. Once the first, second and third bracket sections 20, 22 and 24 are in relative positions to define a desired length dimension of the mounting bracket 12, the one or more fasteners 30 and the one or more fasteners 32 may be tightened to fix or set the relative positions of the first, second and third bracket sections 20, 22 and 24, to fix or set the length dimension of the mounting bracket 12. In addition, the position (height above the floor 18*b*) of the flange extensions or ears 22*i*, 22*j*, 22*k* and 22*l* may be adjusted, by suitably adjusting (sliding or moving) the position of the second bracket section 22, relative to the third bracket section 24. Accordingly, the three (or more) bracket sections 20, 22 and 24 may be slid or moved relative to each other, to adjust the overall length dimension of the mounting bracket 12 (such that the shoes 24*g* and 24*h* engage and abut the floor 18*b* and/or engagement features on the floor 18*b*, when the mounting bracket 12 is connected to the sidewall 18*a*), and also to adjust the height above the floor 18*b* of the flange extensions or ears 22*i*, 22*j*, 22*k* and 22*l*. In particular examples, the height of the flange extensions or ears 22*i*, 22*j*, 22*k* and 22*l* above the floor 18*b* is selected to correspond to a height at which each of the Container brackets 26 and 28 align with the flange extensions or ears 22*i* and 22*j* or 22*k* and 22*l* on the second bracket section 22, while the container 16 is resting on the floor 18*b* of the vehicle bed (or other installation location). In particular examples, when the container 16 is set to rest and be supported (or partially supported) on the floor 18*b* of the vehicle bed (or other installation location), the container brackets 26 and 28 may be positioned adjacent (within a gap between) the flange extensions or ears 22*i* and 22*j* or 22*k* and 22*l* (e.g., at a position at which the pin apertures 22*m* in the flange extensions or ears 22*i* and 22*j* align with the pin aperture 26*d* in the flange or ear 26*b* of the container bracket 26 and corresponding pin apertures in flange extensions or ears 22*k* and 22*l* align with a corresponding pin aperture in the flange or ear of the container bracket 28). The relative position of the second bracket section 22 may be adjusted, relative to the first bracket section 20 or the third bracket section 24 (or both the first and the third bracket sections 20 and 24), to adjust the position of the flange extensions or ears 22*i* and 22*j* or 22*k* and 22*l* to be sufficiently aligned with the flange or ear 26*b* of the container bracket 26 (and corresponding flange or ear on the container bracket 28), to accommodate the size of the container 16 and the distance of the container brackets 26 and 28 above the floor 18*b*.

Figure 13:
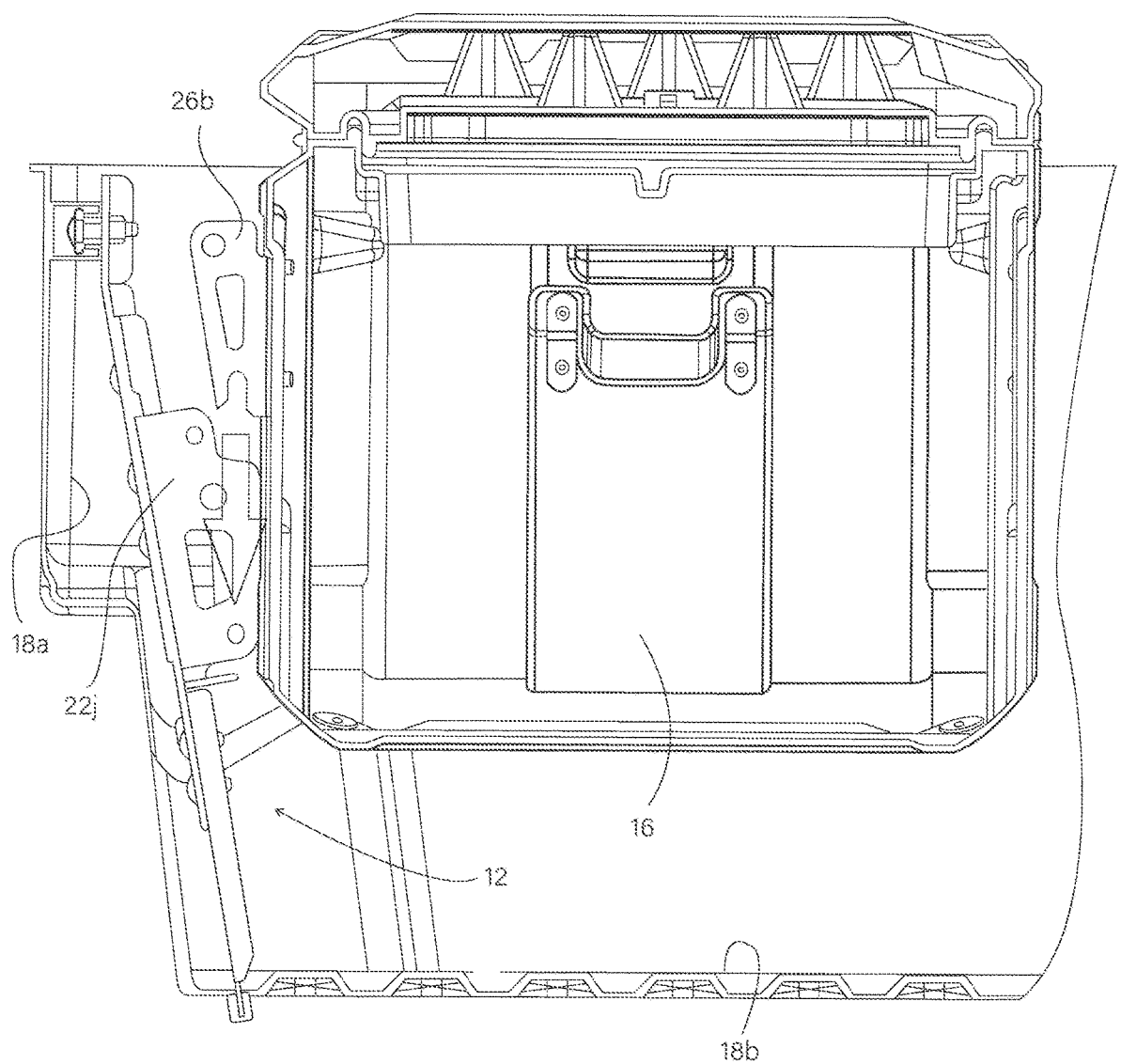
FIGS. 13 and 14 are side views of a container being installed onto a mounting bracket in the vehicle bed.

Once the mounting bracket 12 is installed and mounted to the sidewall 18*a* of the vehicle bed (or other installation location) and is adjusted in length dimension, and in the position of the flange extensions or ears 22*i* and 22*j* or 22*k* and 22*l*, the container 16 may be connected to the mounting bracket 12. In particular examples, to connect the container 16 to the mounting bracket 12, the container 16 is lifted and raised to a height at which the container brackets 26 and 28 are above, and aligned with the flange extensions or ears 22*i*, 22*j*, 22*k* and 22*l*, as shown in FIG. 13. In some examples, the container 16 may be lifted and aligned, manually. In other examples, lifting tools or equipment may be employed to lift and align the container 16.

Figure 14:
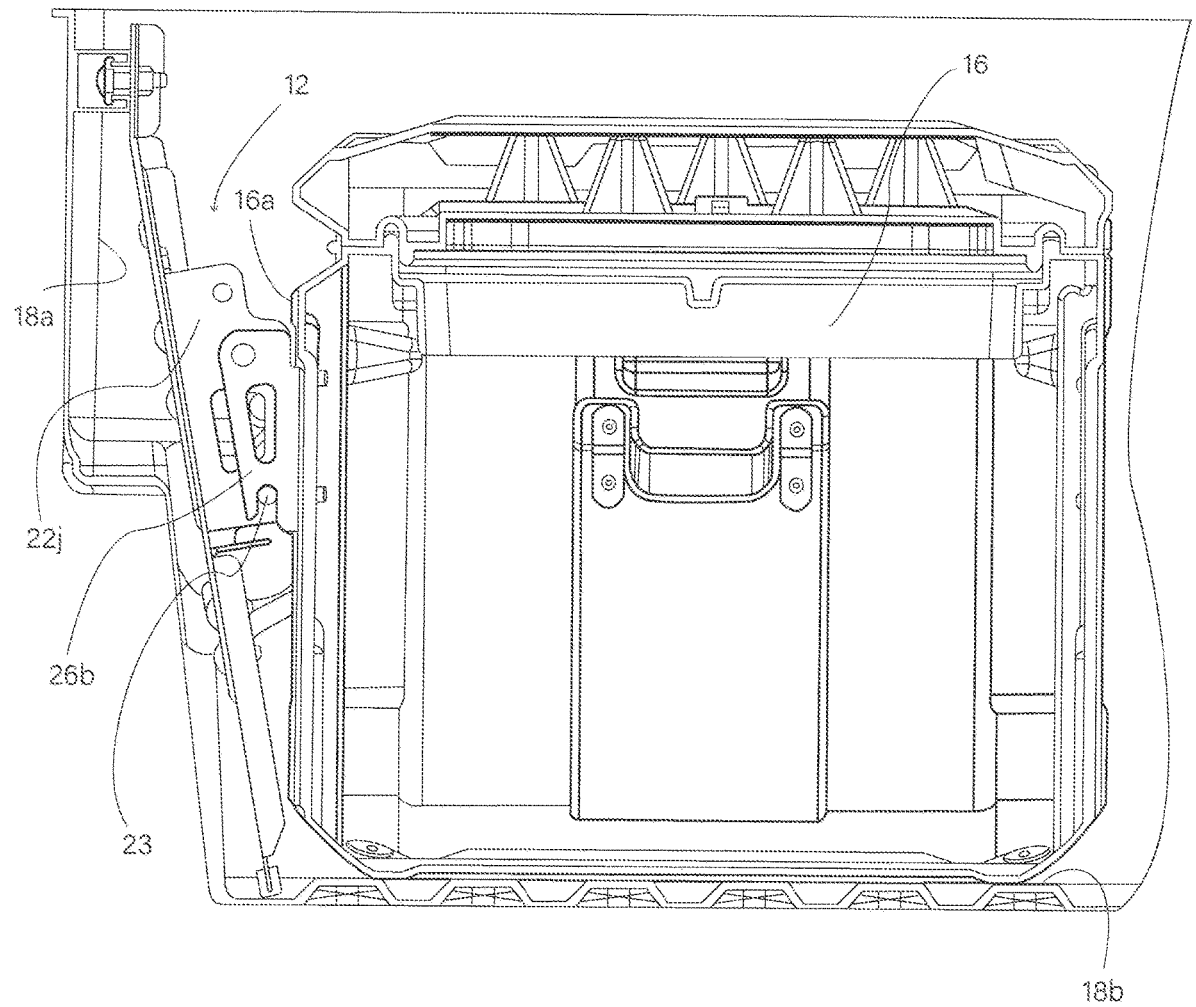

In certain examples, the container 16, when lifted, is aligned with mounting bracket 12, such that the flange or ear 26*b* of the container brackets 26 aligns with the space or gap between the flange extensions 22*i* and 22*j* on one side of the second bracket section 22, and a corresponding flange or ear of the container bracket 28 aligns with the space or gap between the flange extensions 22*k* and 22*l* on the other side of the second bracket section 22. In the aligned position, the container 16 may be lowered, as shown in FIG. 14, such that the flange or ear 26*b* of the container brackets 26 is slid into the space or gap between the flange extensions 22*i* and 22*j*, and the corresponding flange or ear of the container bracket 28 is slid into the space or gap between the flange extensions 22*k* and 22*l*. In particular examples, the container 16 is lowered until the flange or ear 26*b* of the container bracket 26 engages and at least partially rests on the shaft 23 on the flange extensions 22*i* and 22*j*, on one side of the second bracket section 22. Similarly, a corresponding flange or ear of the container bracket 28 rests on the shaft 25 on the flange extensions 22*k* and 22*l*, on the other side of the second bracket section 22. For example, the shaft 23 is received in slot 26*c* of the flange or ear 26*b* of the container bracket 26 (and the shaft 25 is received in a corresponding slot in the flange or ear of the container bracket 28). (The mounting bracket 12 is shown in FIGS. 13 and 14 in a cross section view, with the cross section taken through the gap between the flanges or ears 22*i* and 22*j*. Accordingly, the flange or ear 22*i* is not shown in the view of FIGS. 13 and 14, to show the engagement of the flange 26*b* of the container bracket 26 with the shaft 23 of the mounting bracket 12.)

In particular examples, when the container 16 is fully lowered, the shaft 23 is fully received within the slot 26*c* of the flange or ear 26*b* of the container bracket 26, such that the bracket 26 engages and is at least partially supported on the shaft 23. Similarly, when the container 16 is fully lowered, the shaft 25 is fully received within a corresponding slot (corresponding to the slot 26*c*) of the flange or ear of the container bracket 28, such that the bracket 28 engages and is at least partially supported on the shaft 25. In particular examples, when the container 16 is fully lowered, the bottom of the container 16 may engage and at least partially rest on the floor 18*b* of the vehicle bed (or other installation location). Accordingly, in particular examples, when the container brackets 26 and 28 of the container 16 are received by and connected to the mounting bracket 12, the container 16 may be partially supported or stabilized by the shafts 23 and 25 and also partially supported or stabilized by the floor 18*d* of the vehicle bed (or other installation location), as shown in FIG. 1.

In the fully lowered position of the container 16, the pin aperture 26*d* in the container bracket 26 aligns with the pin apertures 22*m* in the flanges or ears 22*i* and 22*j* of the second bracket section 22. Similarly, in the fully lowered position of the container 16, a corresponding pin aperture (corresponding to the pin aperture 26*d*) in the container bracket 28 aligns with the pin apertures 22*m* in the flanges or ears 22*k* and 22*l* of the second bracket section 22. In the aligned state, the pin apertures may receive the pins 34 and 36. The pins 34 and 36 may be configured to be selectively inserted into the aligned pin apertures to further install or connect the container brackets 26 and 28 to the second bracket section 22 of the mounting bracket 12, and (after installation) to be selectively withdrawn from the aligned pin apertures to disconnect and allow removal of the container 16 from the mounting bracket 12.

In particular examples, each pin 34 and 36 includes a shaft portion having a size and shape to fit through the aligned pin apertures, a head portion that is of a size or shape that will not fit through the aligned pin apertures, and a cotter pin hole 34*a* or 36*a* for selectively receiving a cotter pin 35 or 37. The cotter pin holes 34*a* and 36*a* may be located adjacent an opposite end of the pin 34 and 36, respectively, relative to the head portion of the pin. In particular examples, the pin 34 may be received within the aligned pin apertures and extend through the flanges or ears 22*i* and 22*j* of the bracket section 22 and the flange 26*b* of the container bracket 26, such that the end portion and cotter pin hole 34*a* of the pin 34 is exposed on one side of the flange or ear 22*j*. Similarly, the pin 36 may be received within the aligned pin apertures and extend through the flanges or ears 22*k* and 22*l* of the bracket section 22 and a flange corresponding to flange 26*b* of the container bracket 28, such that the end portion and cotter pin hole 36*a* of the pin 36 is exposed on one side of the flange or ear 22*k*. When received within the aligned pin apertures, the pins 34 and 36 further connect the container brackets 26 and 28 to the second bracket section 22 of the mounting bracket 12, and inhibit the container brackets 26 and 28 (and the container 16) from lifting upward, relative to the mounting bracket 12 (and the vehicle bed or other installation location to which the mounting bracket 12 is mounted). In particular examples, the pins 34 and 36 are configured to be manually inserted and (once inserted) manually removed from the aligned pin apertures, by a user. In certain examples, the pins 34 and 36 may include lops or handles 34*b* and 36*b*, to allow a user to grip the pins and apply a pushing force or a pulling force to selectively insert or withdraw the pins 34 and 36 into or from the aligned pin apertures.

In particular examples, when the pins 34 and 36 are received in the aligned pin apertures, the cotter pins 35 and 37 may be selectively received within the cotter pin holes 34*a* and 36*a*, respectively, to help retain the pins 34 and 36 within the aligned pin apertures. In certain examples, each cotter pin 35 and 37 may include a loop or other feature defining an opening 35*a* and 37*a*, respectively. When the cotter pins 35 and 37 are inserted into the cotter pin holes 34*a* and 36*a*, the openings 35*a* and 37*a* in the cotter pins 35 and 37 may be aligned with the apertures 22*n* in the flanges or ears 22*j* and 22*k*, respectively, to receive a portion of a padlock or other locking mechanism. When a padlock or other locking mechanism is inserted through the aligned openings 35*a* and 37*a* in the cotter pins 35 and 37 and the apertures 22*n* in the flanges or ears 22*j* and 22*k*, the cotter pins 35 and 37 may be locked in place, within the cotter pin holes 34*a* and 36*a* of the pins 34 and 36 (and the installed mounting system 10 is in a locked state). In that state, the pins 34 and 36 are locked in place within the aligned pin apertures, and the container brackets 26 and 28 (and the container 16) are, therefore, locked to the second bracket section 22 of the mounting bracket 12.

When installed and in a locked state in the vehicle bed 18 (or other installation location), the mounting system 10 supports the container 16 in the vehicle bed. In particular examples, the mounting bracket 12 inhibits movement of the container 16 within the vehicle bed 18 in a lateral direction, forward or rearward directions (or combinations thereof) of the vehicle bed 18, or in an upward direction (lifting off) of the vehicle bed. While installed and connected to the mounting bracket 12, the container 16 may be inhibited from moving within the vehicle bed (or other installation location), for example, during traveling movement of the vehicle. In addition, when the mounting bracket 12 locked with a padlock or other locking mechanism as described herein, the container 16 may be inhibited from being stolen or otherwise removed from the vehicle bed (or other installation location).

From an installed state and locked state, the container 16 may be selectively unlocked from the mounting bracket 12, by selectively unlocking the padlock or other locking mechanism and removing the padlock or other locking mechanism from one or each of the aligned openings 35*a* or 37*a* in the cotter pins and apertures 22*n* in the flange or ear 22*j* or 22*k*. Then the container 16 may be selectively disconnected from the mounting bracket 12, by withdrawing the pins 34 and 36 from the aligned pin apertures. Then the container 16 may be selectively removed from the mounting bracket 12, by lifting or raising the container 16 relative to the mounting bracket 12, to lift the container brackets 26 and 28 off of the shafts 23 and 25, and to withdraw the flanges of the container brackets 26 and 28 from the gap between the flanges or ears 22*i* and 22*j*, and the flanges or ears 22*k* and 22*l* on the second bracket section 22 of the mounting bracket 12. Then, the container 16 may be moved or carried away from the mounting bracket 12 (and from the vehicle bed or other installation location), or may be selectively re-installed on the mounting bracket 12. In other examples, other suitable methods for installing or removing the container mounting system 10 and/or the container 16 from the vehicle bed 18 (or other installation location) may be employed.

While the illustrated examples include a mounting bracket 12 having first, second and third bracket sections 20, 22 and 23, other embodiments may include two mounting bracket sections, or more than three mounting bracket sections that are connected together and adjustable, to adjust the length dimension of the mounting bracket. While the illustrated examples include fasteners that may be threaded fasteners, other embodiments may include other types of fasteners including, but not limited to rivets, clamps, friction fitted members, combinations thereof, or the like.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the container as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. Where one example of an element from one embodiment that can be incorporated or utilized in another embodiment described above, it should be appreciated that various features of different embodiments may be incorporated or utilized together with any of the other embodiments disclosed herein.

What is claimed is:

1. A mounting system for securing a container to a bed of a vehicle, the system comprising:
    a mounting bracket having a length dimension and being adjustable in the length dimension, the mounting bracket having a first end portion and a second end portion in the length dimension, the second end portion having at least one foot portion for engaging a floor surface of the bed;
    a first connection joint for attaching the first end portion of the mounting bracket to a sidewall of the bed; and a second connection joint for attaching a central portion of the mounting bracket to the container;

wherein the bracket is adjustable to a length dimension sufficient to engage the foot portion of the bracket to the bottom surface of the bed, while the bracket is attached to the side wall of the bed through the first connection joint;

wherein the mounting bracket comprises a plurality of bracket sections that are arranged adjacent to each other and slidable relative to each other in the length dimension of the mounting bracket, to adjust the length dimension of the mounting bracket, and wherein the plurality of bracket sections include first, second and third bracket sections, the first bracket section has the first end portion, the third bracket section has the second end portion, and the second bracket section is between the first bracket section and the third bracket section and has the central portion.

2. The mounting system of claim 1, further comprising the container, wherein the container has at least one container bracket configured to attach to the second connection joint, for attaching the central portion of the mounting bracket to the container.

3. A mounting system for securing a container to a bed of a vehicle, the system comprising:
   a mounting bracket having a length dimension and being adjustable in the length dimension, the mounting bracket having a first end portion and a second end portion in the length dimension, the second end portion having at least one foot portion for engaging a floor surface of the bed;
   a first connection joint for attaching the first end portion of the mounting bracket to a sidewall of the bed;
   a second connection joint for attaching a central portion of the mounting bracket to the container; and
   the container, wherein the container has at least one container bracket configured to attach to the second connection joint, for attaching the central portion of the mounting bracket to the container;
   wherein the bracket is adjustable to a length dimension sufficient to engage the foot portion of the bracket to the bottom surface of the bed, while the bracket is attached to the side wall of the bed through the first connection joint;
   wherein the mounting bracket has a first pair of flanges defining a gap between the flanges, and a shaft connected to the first pair of flanges and extending across the gap; and
   wherein one of the container brackets has a further flange that is configured to be selectively received within the gap between the first pair of flanges of the mounting bracket, the further flange having a slot-shaped feature that is configured to receive the shaft, when the further flange of the container bracket is received within the gap between the first pair of flanges of the mounting bracket.

4. The mounting system of claim 3, further comprising at least one connector pin, wherein each of the flanges of the first pair of flanges and the further flange include a pin aperture configured to align and selectively receive one of the connector pins when the further flange of the container bracket is received within the gap between the first pair of flanges of the mounting bracket.

5. The mounting system of claim 3, wherein the connector pin is received within the pin apertures when aligned, and is manually removable from the pin apertures.

6. The mounting system of claim 4, further comprising at least one cotter pin, wherein each connector pin has a cotter pin hole for selectively receiving one of the cotter pins when the connector pin is received in the pin apertures of the flanges of the first pair of flanges and the further flange, for inhibiting removal of the connector pin from the pin apertures.

7. The mounting system of claim 6, wherein:
   at least one of the flanges of the first pair of flanges includes an opening for receiving a padlock or other locking mechanism;
   each cotter pin has a loop or further opening that is configured to be aligned with the opening in the at least one of the flanges, for receiving the padlock or other locking mechanism, to selectively lock the cotter pin in the connector pin and inhibit removal of the connector pin from the aligned pin apertures in the first pair of flanges and the further flange.

8. The mounting system of claim 4, wherein:
   the mounting bracket has a second pair of flanges defining a gap between the second pair of flanges;
   the mounting bracket has a second shaft connected to the second pair of flanges and extending across the gap; and
   a second one of the container brackets has a second further flange that is configured to be selectively received within the gap between the second pair of flanges of the mounting bracket, the second further flange having a slot-shaped feature that is configured to receive the second shaft, when the second further flange of the container bracket is received within the gap between the second pair of flanges of the mounting bracket.

9. The mounting system of claim 1 further comprising at least one first fastener that connects the plurality of bracket sections of the mounting bracket together for sliding motion.

10. A mounting system for securing a container to a bed of a vehicle, the system comprising:
   a mounting bracket having a length dimension and being adjustable in the length dimension, the mounting bracket having a first end portion and a second end portion in the length dimension, the second end portion having at least one foot portion for engaging a floor surface of the bed;
   a first connection joint for attaching the first end portion of the mounting bracket to a sidewall of the bed; and
   a second connection joint for attaching a central portion of the mounting bracket to the container;
   wherein the bracket is adjustable to a length dimension sufficient to engage the foot portion of the bracket to the bottom surface of the bed, while the bracket is attached to the side wall of the bed through the first connection joint;
   wherein the mounting bracket comprises a plurality of bracket sections that are arranged adjacent to each other and slidable relative to each other in the length dimension of the mounting bracket, to adjust the length dimension of the mounting bracket;
   wherein at least one first fastener connects the plurality of bracket sections of the mounting bracket together for sliding motion;
   wherein the plurality of bracket sections of the mounting bracket include a first bracket section having a first aperture through which the at least one first fastener extends, and a second bracket section having a second aperture through which the at least one first fastener extends;

wherein at least one of the first and second apertures has an elongated slot-shaped length dimension extending along at least a portion of the length dimension of the mounting bracket; and wherein the at least one first fastener is configured to be selectively loosened to allow the first bracket section and the second bracket section to slide relative to each other while the at least one first fastener moves along the length dimension of at least one of the elongated first or second apertures to adjust the length of the mounting bracket, and to be selectively tightened to lock or fix the length of the mounting bracket.

11. The mounting system of claim 10, wherein:
at least one of the first bracket section and the second bracket section has at least one first engagement feature;
at least one of the first bracket section and the second bracket section has at least one second engagement feature that is configured to selectively engage with the at least one first engagement feature when the first bracket section and the second bracket section are in a particular slid state relative to each other; and
the first bracket section and the second bracket section are inhibited from further sliding movement relative to each other when the at least one first engagement feature and the at least one second engagement feature are engaged with each other and the at least one first fastener is tightened.

12. The mounting system of claim 11, wherein:
the at least one first engagement feature comprises at least one raised rib or other protrusion; and
the at least one second engagement feature comprises at least one recess or opening having a size and shape to receive the at least one rib or other protrusion.

13. The mounting system of claim 9, wherein:
the third bracket section has a third aperture through which the at least one second fastener extends;
the second bracket section has a fourth aperture through which the at least one second fastener extends;
at least one of the third and fourth apertures has an elongated slot-shaped length dimension extending along at least a portion of the length dimension of the mounting bracket; and
the at least one second fastener being configured to be selectively loosened to allow the third bracket section and the second bracket section to slide relative to each other while the at least one second fastener moves along the length dimension of at least one of the elongated third or fourth apertures to adjust the length of the mounting bracket, and to be selectively tightened to lock or fix the length of the mounting bracket.

14. The mounting system of claim 13, wherein:
at least one of the first bracket section, second bracket section or third bracket section has at least one first engagement feature;
at least one of the first bracket section, second bracket section or third bracket section has at least one second engagement feature that is configured to selectively engage with the at least one first engagement feature when two of the first bracket section, second bracket section or third bracket section are in a particular slid state relative to each other;
said two bracket sections are inhibited from further sliding movement relative to each other when the at least one first engagement feature and the at least one second engagement feature are engaged and the at least one first fastener or the at least one second fastener are tightened.

15. The mounting system of claim 14, wherein:
the at least one first engagement feature comprises at least one raised rib or other protrusion; and
the at least one second engagement feature comprises at least one recess or opening having a size and shape to receive the at least one rib or other protrusion.

16. The mounting system of claim 1, wherein the first connection joint includes at least one further bracket section that is configured to be arranged within a rail on the sidewall of the bed, and at least one fastener for connecting the first end portion of the mounting bracket to the at least one further bracket section, with a portion of the rail arranged between the first end portion of the mounting bracket and the at least one further bracket section.

17. The mounting system of claim 1, wherein the first connection joint includes at least one further bracket section that is configured to be arranged adjacent an upper flange or lip on the sidewall of the bed, and at least one fastener for connecting the first end portion of the mounting bracket to the at least one further bracket section, with a portion of the upper flange or lip arranged between the first end portion of the mounting bracket and the at least one further bracket section.

18. The mounting system of claim 1, wherein the at least one foot portion includes at least one shoe having a friction enhancing surface for enhancing frictional engagement with the floor surface of the bed.

* * * * *